(12) United States Patent
Tachibe et al.

(10) Patent No.: US 6,449,107 B2
(45) Date of Patent: Sep. 10, 2002

(54) OPTICAL BEAM SCANNING DEVICE

(75) Inventors: Hidenari Tachibe; Hiromu Nakamura; Etsuko Shibata, all of Toyokawa (JP)

(73) Assignee: Minolta Co., Ltd., Suita (JP)

( * ) Notice: Subject to any disclaimer, the term of this patent is extended or adjusted under 35 U.S.C. 154(b) by 0 days.

(21) Appl. No.: 09/757,639

(22) Filed: Jan. 11, 2001

Related U.S. Application Data

(62) Division of application No. 09/315,085, filed on May 19, 1999, now Pat. No. 6,195,190.

(30) Foreign Application Priority Data

| May 20, 1998 | (JP) | 10-153645 |
| May 22, 1998 | (JP) | 10-156839 |
| Apr. 30, 1999 | (JP) | 10-125251 |

(51) Int. Cl.[7] .................................................. G02B 7/02
(52) U.S. Cl. ...................................................... 359/819
(58) Field of Search ................................. 359/819, 820, 359/811

(56) References Cited

U.S. PATENT DOCUMENTS

| 4,815,059 A | | 3/1989 | Nakayama et al. |
| 5,612,945 A | * | 3/1997 | Van Rosmalen ............ 369/247 |
| 5,614,961 A | * | 3/1997 | Gibeau et al. .............. 348/750 |
| 5,671,081 A | | 9/1997 | Hisa |
| 5,818,262 A | | 10/1998 | Hisa |
| 5,877,884 A | | 3/1999 | Yanagisawa |
| 5,920,437 A | * | 7/1999 | Shirotori ..................... 359/824 |

FOREIGN PATENT DOCUMENTS

| JP | 06-075184 | | 3/1994 | |
| JP | 08-142132 | | 6/1996 | |
| JP | 08-142142 | | 6/1996 | |
| JP | 08-216174 | | 8/1996 | |
| JP | 10-69665 A | * | 3/1998 | .......... G11B/7/135 |
| JP | 10-34490 A | * | 12/1998 | ............ G11B/7/09 |

* cited by examiner

*Primary Examiner*—Ricky Mack
(74) *Attorney, Agent, or Firm*—Morrison & Foerster LLP

(57) ABSTRACT

The light beam scanning device has a casing injection molded from magnesium or magnesium alloy as the material. A polygon mirror and a motor are sealed in the inside of the casing and a cover covering the latter. Since the thickness of the magnesium or magnesium alloy material can be reduced, heat generated from a motor is dissipated satisfactorily. Heat dissipating fins are formed to the casing to promote heat dissipation and enhance the strength of the casing.

14 Claims, 24 Drawing Sheets

FIG. 3

| PHYSICAL PROPERTY VALUE, etc. \ MATERIAL | ALUMINUM | RESIN (*1) | MAGNESIUM |
|---|---|---|---|
| YOUNG'S MODULUS | 7000 | 960 | 4500 |
| SPECIFIC GRAVITY | 2.7 | 1.6 | 1.7 |
| HEAT CONDUCTIVITY | 0.23 | 0.0007 | 0.17 |
| YOUNG'S MODULUS /SPECIFIC GRAVITY | 2590 | 600 | 2650 |
| THICKNESS (mm) | 3 | 0.009 | 2.2 |

*1 : RESIN INCORPORATED WITH 50% GLASS FILLER

FIG. 25

LASER (NORMAL TEMPERATURE t = 20°C)

| | |
|---|---|
| OSCILLATION WAVELENGTH [nm] | 780 |
| TEMPERATURE DEPENDENCY OF OSCILLATION WAVELENGTH ($\Delta \lambda$) [nm·deg$^{-1}$] | 0.23 |

FIG. 26

OPTICAL SYSTEM
($\lambda = 780$nm, NORMAL TEMPERATURE t = 20°C)

| | COLLIMATOR LENS | f$\theta$ LENS |
|---|---|---|
| FOCAL LENGTH [nm] | 8~16 | 300 |
| GLASS MATERIAL | SF57 | ZEONEX (TRADE MARK) |
| REFRACTIVE INDEX | 1.82489 | 1.51882 |
| LINEAR EXPANSION COEFFICIENT ($\Delta L$) [mm·deg$^{-1}$] | 7.9E-06 | 6.9E-05 |
| TEMPERATURE DEPENDENCY OF REFRACTIVE INDEX (d) [deg$^{-1}$] | 9.5E-06 | -8.4E-05 |
| DISPENSAVILITY ($\nu^{-1}$) [nm$^{-1}$] ($\lambda = 780$nm) | 8.69E-05 | 4.25E-05 |

FIG. 27

LIGHT SOURCE HOLDING MEMBER

| | Mg | Al | Fe |
|---|---|---|---|
| LINEAR EXPANSION COEFFICIENT $(\Delta L_{HC})$ [mm·deg$^{-1}$] | 2.6E-05 | 2.3E-05 | 1.17E-05 |

FIG. 28

LASER (AT ELEVATED TEMPERATURE +30deg, t = 50°C)

| OSCILLATION WAVELENGTH [nm] | 786.9 |
|---|---|
| (780+0.23*30=786.9) | |

FIG. 29

OPTICAL SYSTEM, COLLIMATOR LENS
(AT ELEVATED TEMPERATURE +30deg, t = 50°C)

| | COLLIMATOR LENS | fθ LENS |
|---|---|---|
| REFRACTIVE INDEX n' | 1.82468 | 302.174 |
| FOCAL LENGTH fl'$_{co}$ [nm] | 1.000491·fl$_{co}$ | 1.51615 |

FIG. 30

OPTICAL SYSTEM, COLLIMATOR LENS
(AT ELEVATED TEMPERATURE +30deg, t = 50°C)

| FOCAL LENGTH AT 20°C fl$_{co}$ [mm] | FOCAL LENGTH AT 50°C fl'$_{co}$ [mm] | FOCAL LENGTH CHANGE L1 [μm] |
|---|---|---|
| 8 | 8.00393 | 3.93 |
| 10 | 10.00491 | 4.91 |
| 12 | 12.00589 | 5.89 |
| 14 | 14.00688 | 6.88 |
| 16 | 16.00786 | 7.86 |

FIG. 31

SHIFTING AMOUNT OF LASER EMISSION POINT (L2) FOR COMPENSATING IMAGE FIELD SHIFT DUE TO FOCAL LENGTH CHANGE OF fθ LENS

| FOCAL LENGTH OF COLLIMATOR fθ$_{co}$ [mm] | SHIFTING AMOUNT OF EMISSION POINT L2 [μm] |
|---|---|
| 8 | 1.53 |
| 10 | 2.40 |
| 12 | 3.45 |
| 14 | 4.70 |
| 16 | 6.14 |

AMOUNT OF CHANGE (L3) BETWEEN LASER EMISSION POINT AND CLLIMATOR LENS

| FOCAL LENGTH OF COLLIMATOR [mm] | Mg L3 [μm] | Al L3 [μm] | Fe L3 [μm] |
|---|---|---|---|
| 8 | 6.24 | 5.52 | 2.81 |
| 10 | 7.80 | 6.90 | 3.54 |
| 12 | 9.36 | 8.28 | 4.21 |
| 14 | 10.92 | 9.66 | 4.91 |
| 16 | 12.48 | 11.04 | 5.62 |

OPTICAL BEAM SCANNING DEVICE

This application is a divisional of application Ser. No. 09/315,085, filed May 19, 1999 now U.S. Pat. No. 6,195,190.

This application is based on applications No. H10-153645, H10-156839 and H11-125251 filed in Japan, the contents of which are hereby incorporated by reference.

BACKGROUND OF THE INVENTION

1. Field of the Invention

The present invention concerns an optical beam scanning device used in image forming apparatus such as laser printers or copying machines.

2. Description of the Related Art

An optical beam scanning device is used, for example, for a laser printer or a digital copying machine. In the optical beam scanning device, a laser beam emitted from a laser light source is deflected by a polygon mirror rotating at a high speed and scans the surface on a light sensitive body.

Since the polygon mirror rotates through the air, when a laser printer or a digital copying machine is used for a long time, oil droplets or paper dusts floating in the apparatus are deposited on the surface of the polygon mirror. In order to avoid such deposition, the polygon mirror is usually sealed together with a driving device in a housing.

In recent years, a processing speed in the laser printer or the digital copying machine has been increased more and the rotational speed of the polygon mirror of the optical beam scanning device is also increased correspondingly. Increase of the rotational speed increase heat generation in a driving device such as a motor for rotationally driving the polygon mirror and a drive circuit for the motor (usually IC is used). Since the polygon mirror and the drive circuit are sealed as described above, the generated heat is less dissipated but confined in the housing to elevate the temperature of them.

Temperature elevation in the drive circuit results in not only fluctuation of electric characteristics of ICs or motors or fluctuation (deterioration) of mechanical characteristics of motor bearings but also fluctuation of optical characteristics of the optical system by thermal deformation.

Heat generated in the motor, the drive circuit and the like is transmitted mainly by way of thermal conduction or convection of internal air to the inner wall surface of a housing that seals them, and further transmitted from the inner wall surface by way of heat conduction to the outer wall surface of the housing and then released from the outer wall surface mainly by convection.

Therefore, in order to improve the heat dissipation, it is required to improve the heat conduction of the housing itself, for example, it is necessary to select a material of high heat conductivity as the material for the housing. Japanese Patent Unexamined Publication Hei 6-75184 discloses a housing a portion of which is made of a metal material with the view point described above.

The invention disclosed in patent publication only utilizes that a metal generally has high heat conductivity. However, in order to improve the heat dissipation, it is necessary to also make the heat conduction path as short as possible, namely, to decrease the wall thickness of the housing as thin as possible since the heat is transmitted mainly along the direction of the thickness of the housing. However, reduction of the wall thickness is 3 mm in aluminum die casting employed usually with a view point of manufacture. The invention disclosed in the above mentioned publication does not pay attention also to these points.

Further, since the polygon mirror rotates at a high speed, vibrations are generated due to slight imbalance in itself or rolling of bearing rolling members. Since the vibrations are transmitted also to the housing, if this frequency is close the natural frequency of the housing, the housing causes resonance and the amplitude of the vibrations of the polygon mirror is also increased. As a result, this leads to a drawback that the axis of an optical beam reflected by the polygon mirror is deflected, or the working life of the bearings is shortened.

The natural frequency of the housing is determined such that it is higher than the frequency of vibrations generated from a rotational portion such as a polygon mirror and apart therefrom as much as possible. However, since the rigidity of the housing is lowered as the wall thickness is reduced, the natural frequency thereof is generally lowered and the frequency generated from the polygon mirror is increased as its rotational speed goes higher, so that the two frequencies are inevitably approach to each other.

The invention disclosed in the publication described above does not pay consideration to such problems of vibrations.

Further, elevation of temperature causes several problems also with respect to a laser light source. The laser light source comprises an LD (laser diode here and hereinafter) and an LD holder, a collimator lens and a collimator lens barrel and, further, a collimator holder for holding the LD holder and the lens barrel and attaching them to an optical housing. Among them, the holder member is a molding product by aluminum die casting or resin molding. Further, a slit controlling the beam diameter is attached to a collimator lens barrel and an LD drive substrate is attached for driving the LD as a unit in some of them.

When the temperature of an atmosphere for the laser light source is elevated, the following phenomena are caused.

(a) [Movement Mainly by Wavelength]

The oscillation wavelength of an LD shifts to a longer wave length area and, as a result, a refractive index of a lens is lowered and a focal point shifts to a positive side.

(b) [Movement by the Change of Distance]

The distance between the LD emission point and the collimator lens is increased by thermal expansion of the collimator holder and, as a result, the focal point shifts to a negative side.

It has been known to offset the movement in a and b to each other so as not to shift the focal point even if the temperature is elevated (Japanese Patent Unexamined Publication Sho 63-7530).

In recent years, since it has been required to reduce the beam diameter on the surface to be scanned along with increase in the recording density, it is necessary, accompanying therewith to enlarge the width of the luminous flux corresponding therewith, tending to make the focal length of the collimator lens longer.

Then, since the depth on the surface to be scanned is made shallow as the beam diameter is reduced, it is necessary to suppress the curvature of image field in order to make the beam diameter uniform within the scanning range and it is necessary to make an f θ lens aspherical or free curved surface. Since such a lens shape other than the spherical shape is difficult to be made by glass, it is often formed with a plastic material.

As the focal lens of the collimator lens is increased, the movement (a) described above is increased, and the thermal expansion coefficient (b) has to be increased in order to make a balance with (b).

Further, also in a case of forming the f θ lens with a resin lens, the amount of change of the focal point due to the temperature change of the f θ lens caused by the change of the wavelength or the refractive index is not negligible and, further, the thermal expansion coefficient (b) has to be increased.

Further, since it is necessary to suppress the elevation of the atmospheric temperature itself in order to maintain the printability, it is necessary to dissipate the heat generated from the light source and the heat transmitted from other members to the light source as rapidly as possible.

Since the error sensitivity for the distance between the LD and the collimator lens is extremely severe upon assembling the later scanning device, it is constituted such that a portion of the collimator holder for receiving the collimator lens barrel is made into a cylindrical or V-shaped block shape, the outer surface of the collimator lens barrel is formed as a cylinder having a rotational axis in common with the optical axis of the collimator lens, and the cylindrical portion is caused to slide in the direction of the optical axis for positioning control.

By the way, since a small lens such as a collimator lens can be formed by glass molding in recent years, configuration into an aspherical or single lens configuration but such a molded lens may sometimes cause non-uniformity during molding although the design performance is improved compared with conventional lenses formed by polishing. If non-uniformity is caused, when collimator lens is rotated around an optical axis as an axis of rotation, the magnitude of a sub-peak changes when the beam shape on the scanning surface is observed. Therefore, it has to be controlled such that the collimator lens is at an optimal angle.

Accordingly, it is desirable that the collimator lens barrel is rotatable by 360° around the optical axis of the collimator lens as the axis of rotation, but the collimator lens barrel includes a boundary of a split mold for injection molding (metal-injection) at the outer cylindrical surface to cause burrs. Therefore, the rotational position can not be controlled over 360° unless machining is applied.

SUMMARY OF THE INVENTION

It is an object of the present invention to provide an optical beam scanning device with improved heat dissipation by using a material having high heat conductivity for a housing containing a polygon mirror and a drive circuit therefor.

It is another object of the present invention to provide an optical beam scanning device improved with heat dissipation property by reducing the wall thickness of the housing without lowering the natural frequency.

It is a further object of the present invention to provide an optical device capable of sufficiently ensuring a shifting amount of a focal point movement to a negative side due to heat expansion of the distance between an LD emission point and a collimator lens, so as to effectively offset the increase of the moving amount of the focal point to the positive side caused by the increase of the focal point of the collimator lens and the increase in the oscillation frequency wavelength due to the temperature elevation of LD.

It is a further object of the present invention to provide an optical device capable of dissipating heat from an optical source and a heat transmitted from another members to the optical source as rapidly as possible.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore references made to the claims which follow by the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIG. 3 is a table for physical properties of aluminum, resin incorporated with 50% glass filler and magnesium. In the table, numerical values described in the column for wall thickness show necessary wall thickness for each material in order to obtain identical heat dissipating property (aluminum of 3 mm thickness as standard).

FIG. 25 is a table showing a transmission wavelength of a laser and fluctuation of transmission wavelength per unit temperature, under normal temperature (20° C.).

FIG. 26 is a table for various factors of an optical system under a normal temperature.

FIG. 27 is a table showing a linear expansion coefficient of a material for a light source holding member (holding member) for magnesium, aluminum and iron.

FIG. 28 is a table for oscillation wavelength of a laser below 50° C.

FIG. 29 is a table for values determined for the refractive index and a focal length below 50° C. of a collimator lens and an f θ lens.

FIG. 30 is a table showing the effect of temperature elevation on the focal length of a collimator lens.

FIG. 31 is a table for numeral values for the shifting amount of a laser emission point (L2) determined for various focal length for amending the curvature field shift caused by the change of the focal length of an f θ lens with respect to various focal length of a collimator lens.

DESCRIPTION OF THE PREFERRED EMBODIMENTS

In the present specification, the term "magnesium" means elemental magnesium or an a magnesium alloy such as Mg—Al alloy, Mg—Mn alloy, Mg—Zn alloy, Mg-rare earth metal alloy, and Mg—Al—Zn alloy. Particularly, a magnesium alloy AZ91D used in a die casting method (ingredient: Mg 8.3–9.7, Al 0.35–1.0 and ZnO 15 or more) can be utilized as it is.

The magnesium injection molding used herein (thixotropic molding method) is different from die casting utilizing a metal in a completely molten state but injects a metal slurry in solid/liquid coexistent state, namely, a semi-molten state metal into a molding die. This method has a feature, compared with die casting, in that the temperature of the Mg alloy upon molding is low and the shrinkage upon solidification is less, so that molding product of a reduced wall thickness can be prepared with less sinks or cracks, there is less warp even in thin walled products, surface accuracy is high and no secondary fabrication is required to save the cost.

Embodiment 1

Figure 1:
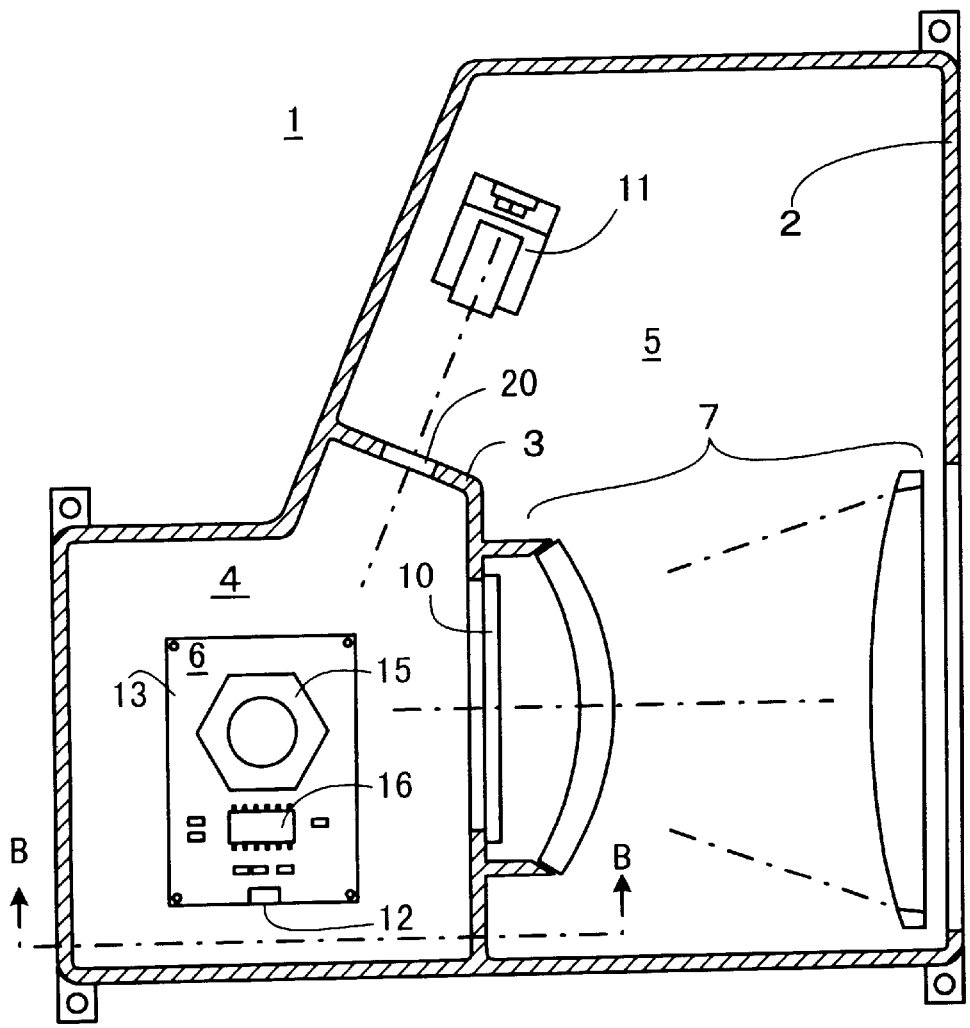
FIG. 1 is a transversal cross sectional view (cross sectional view taken along line A—A in FIG. 2) of an optical beam scanning device in Embodiment 1 of the present invention.
Figure 2:
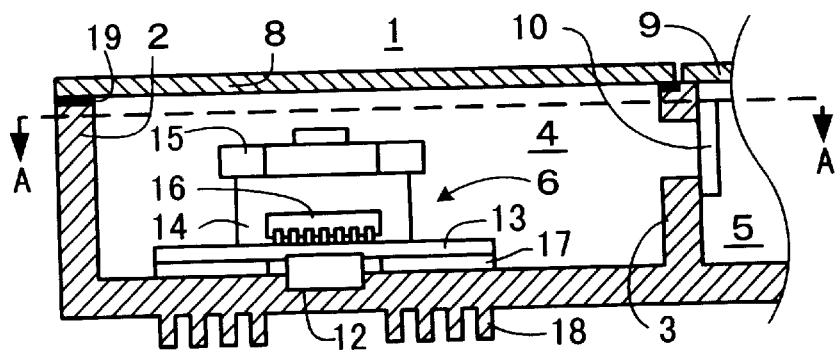
FIG. 2 is a longitudinal cross sectional view (fragmentally cross sectional view taken along line B—B in FIG. 1) of an optical beam scanning device in Embodiment 1 of the present invention.

FIG. 1 is a transversal cross sectional view (cross section taken along line A—A in FIG. 2) of an optical beam scanning device in the first example of the present invention and FIG. 2 is a longitudinal cross sectional view (fragmentary cross sectional view taken along line B—B of cross section in FIG. 1) of the device.

In the figures, are shown an optical beam scanning device 1, a casing 2 for the device and a partition wall 3 in which the inside of the casing 2 is partitioned by the partition wall 3 into a unit chamber 4 and a scanning lens chamber 5. There are also shown a substrate integrated polygon mirror unit 6, a scanning lens 7, a unit chamber cover 8, a scanning lens chamber cover 9, a window glass 10, a laser light source 11, an elastic sheet 19 disposed between the unit chamber cover 8 and the casing 2 and a cylindrical lens 20.

The polygon mirror unit 6 comprises an iron substrate 13, a motor 14 for rotationally driving the polygon mirror 15, and a driving circuit such as a printed board carrying an IC 16 for driving the motor 14, and they constitute a unit.

An optical beam emitted from the layer light source 11 is deflected by the rotating polygon mirror 15, and irradiated on the surface of a light sensitive body not illustrated through the scanning lens 7 in the same manner as in a conventional layer beam optical scanning device, for which no further explanation is made.

The polygon mirror unit 6 is positioned to a predetermined position of the casing 2 by a positioning member 12.

The unit chamber 4 defines a sealed space with a portion of a body of the casing 2, the unit chamber cover 8 and the window glass 10, and prevents intrusion of oil droplets or paper dusts from the outside to the inside of the unit chamber 4. An electrolytically zinc plated steel plate is used for the unit chamber cover 8.

As described previously, generation of heat is increased in the motor 14 for rotating the polygon mirror 15 and the driving IC 16 for the drive circuit by the increase of the rotational speed of the polygon mirror 15.

As described above, since the unit chamber 4 is sealed and can not dissipate heat directly to the outside by the convection of air, the generated heat has to be once transmitted to the inner wall surface of the casing 2 or the unit chamber cover 8, transmitted by heat conduction to the outer wall surface thereof and then released from the surfaces to the outside.

In order to improve the heat dissipation, it is required for the casing 2 and the unit chamber cover 8 that materials having a heat conductivity as high as possible should be elected and the thickness is made as thin as possible.

In this embodiment, a magnesium injection molding product is used for the casing, the thickness of which is reduced to less than the minimum thickness when aluminum is used.

Table (FIG. 3) shows physical properties of aluminum, resin incorporated with 50% glass filler and magnesium.

As can be seen from the table, magnesium is poor with respect to Young's modulus and heat conductivity compared with aluminum but, since the resonance frequency is in proportion with Young's modulus/specific gravity, magnesium is superior to aluminum in that the resonance frequency is higher. Further, although magnesium is inferior to aluminum in view of heat conductivity, but much better than resin and thickness can be reduced, so that heat dissipation can be improved more.

The casing 2 and the iron substrate 13 are not in direct contact with each other. The iron substrate 13 is positioned by the positioning member 12 with a gap between the casing 2 being of about 0.5 mm. A highly heat conductive elastic sheet 17 is interposed in the gap to enable efficient heat conduction with no direct contact of the substrate and the casing 2.

Heat dissipation fins 18 are formed at the back of the casing 2, and air blow is sent by a cooling blower not illustrated to the heat dissipating fins 18, from which heat is dissipated. If the heat dissipation is sufficient, provision of the heat dissipating fins 18 is not particularly necessary. Since the heat dissipating fins 18 also serve as reinforcing ribs and increase the rigidity, the thickness of casing 2 can be reduced further. Reduction in the thickness can also improve the efficiency of heat conduction.

In this embodiment, since the casing 2 is made of a magnesium molding product, the thickness of the casing 2 can be reduced compared with a case of using aluminum or resin. The heat dissipating performance can be maintained or improved satisfactorily without lowering the rigidity and the resonance frequency even with such a reduced thickness.

Further, since highly heat conductive elastic sheets 17, 19 are interposed between the iron substrate 13 and the casing 2 and between the unit chamber cover 8 and the casing 2 in order to avoid direct contact between metals and in order to keep heat conduction satisfactory, corrosion due to contact between magnesium and different kind of metal can be prevented.

Further, since the heat dissipating fins 18 are disposed to the casing 2, they not only promote heat dissipation but also serve as reinforcing ribs, so that the thickness of the casing can be reduced further without lowering the rigidity and the resonance frequency to further make heat conduction further satisfactory.

Embodiment 2

Figure 4:
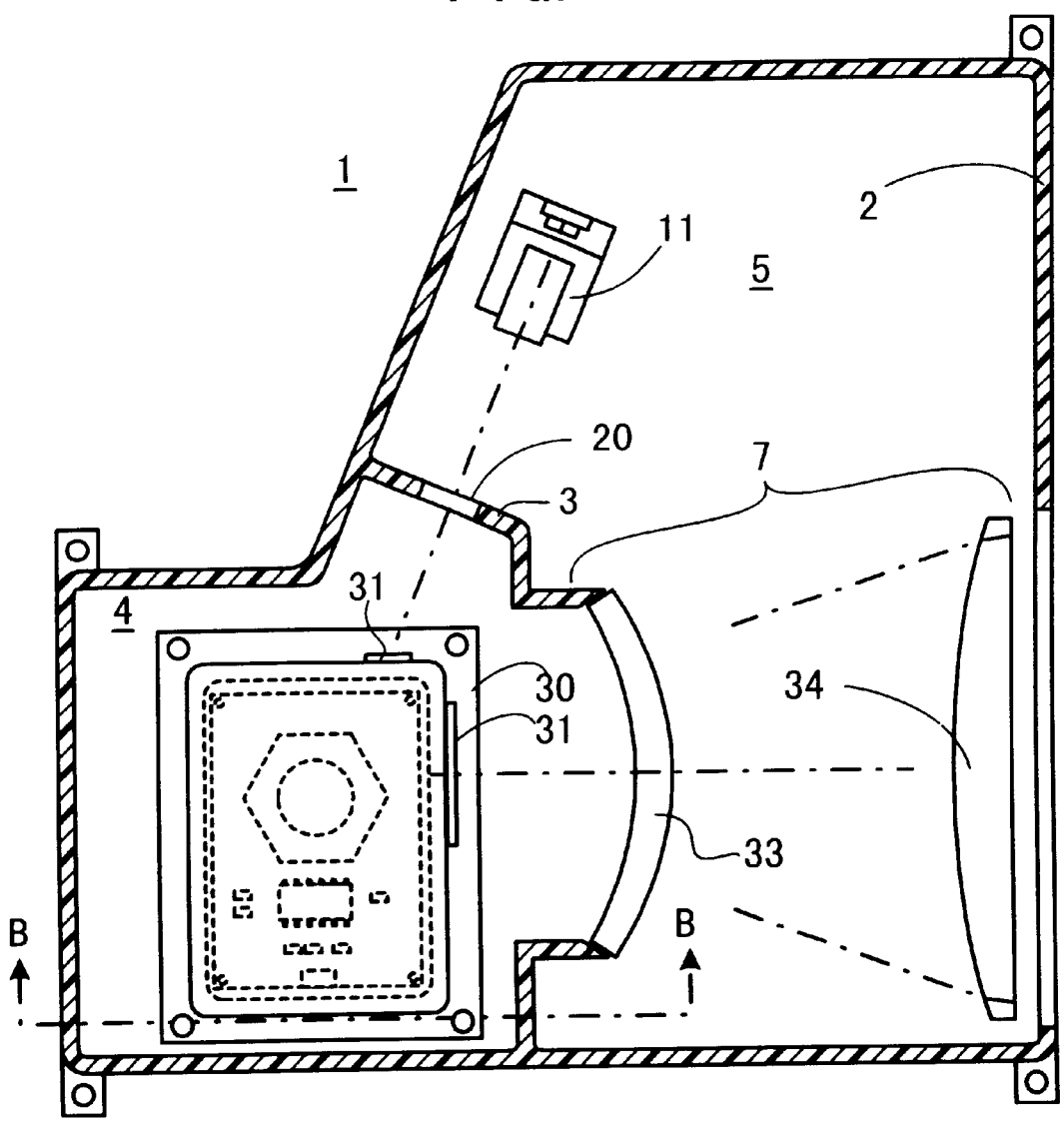
FIG. 4 is a transversal cross sectional view (cross sectional view taken along line A—A in FIG. 5) of an optical beam scanning device in Embodiment 2 of the present invention.
Figure 5:
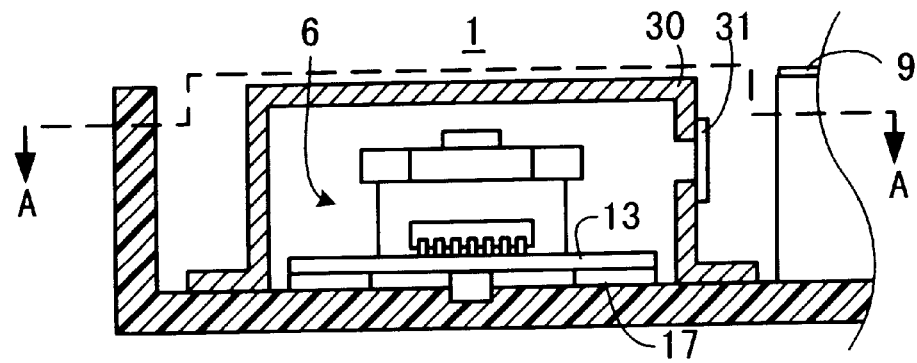
FIG. 5 is a longitudinal cross sectional view (fragmentally cross sectional view taken along line B—B in FIG. 4) of an optical beam scanning device in Embodiment 2 of the present invention.

FIG. 4 is a transversal cross sectional view (line A—A in FIG. 5) of an optical beam scanning device in a second embodiment of the present invention. FIG. 5 is a longitudinal cross sectional view (fragmentary cross sectional view: taken along line B—B in FIG. 4) of the optical scanning device.

In Embodiment 1, the polygon mirror 15 was sealed by the entire unit chamber 4 but, in Embodiment 2, only a portion of the polygon mirror unit 6 is sealed by a polygon mirror unit cover 30. The polygon cover unit 30 is made of a magnesium material, and a window glass 31 is disposed to the window of the polygon mirror unit cover 30 for allowing permeating a laser beam.

The casing 2 is made of a resin incorporated with glass filler different from Embodiment 1. The scanning lens chamber is covered at an upper portion with a cover 9 and sealed conveniently by a lens 33 and a cylindrical lens 20 made of glass.

The polygon mirror unit cover 30 is formed to a thickness of 2.2 mm or less in average, attached to a resin casing 2 and is kept from direct contact with the iron substrate 13. Since it is scarcely required to transmit heat in the elastic heat 17 it is not particularly necessary to make the sheet with a highly heat conductive material, different from Embodiment 1.

Most of heat generated in the polygon unit mirror 6 is released from the upper portion of the polygon mirror unit cover 30 and scarcely reaches the lens 34 that most undergoes the optical effect.

Figure 6:
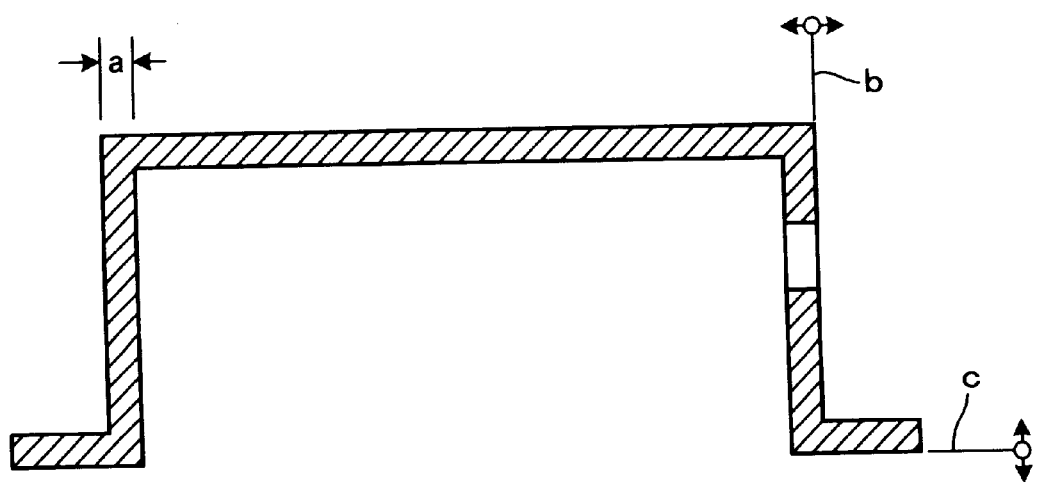
FIG. 6 is a cross sectional view of a polygon mirror unit cover 30 in Embodiment 2 of the present invention.
Figure 7:
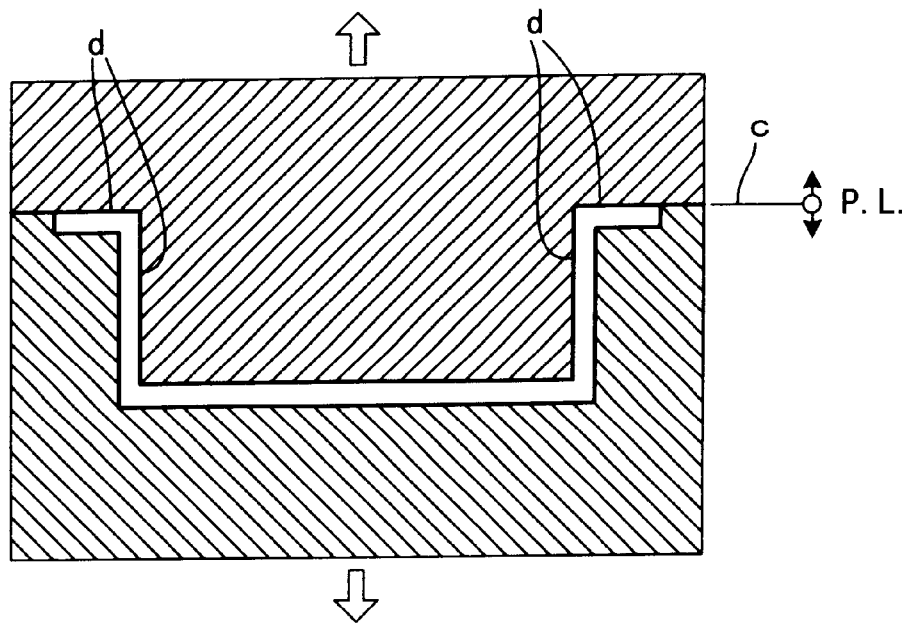
FIG. 7 is an example of a longitudinal cross sectional view for an injection molding die of a polygon mirror unit cover in Embodiment 2 of the present invention.
Figure 8:
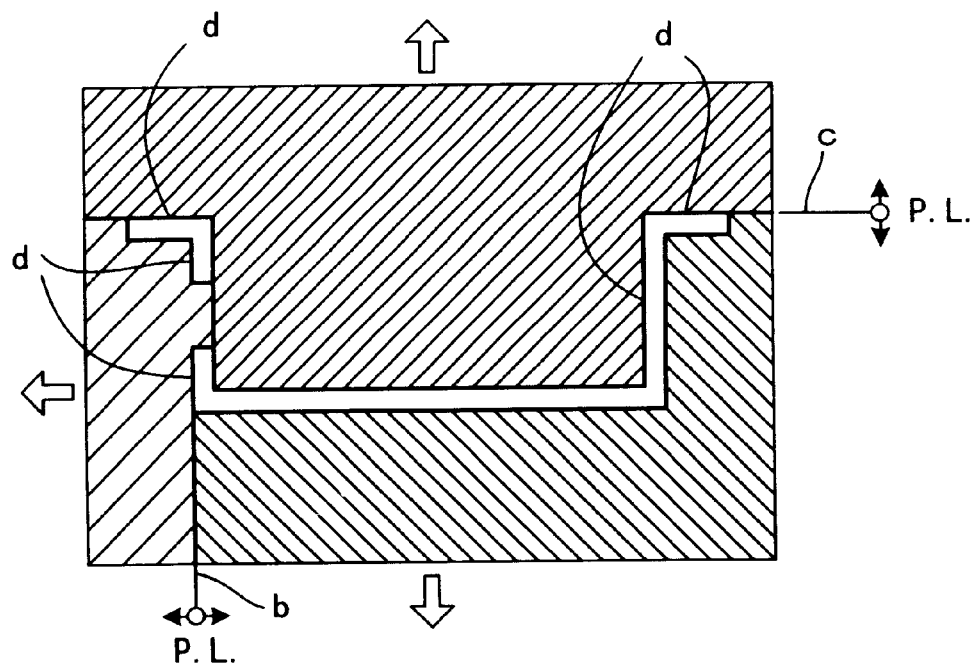
FIG. 8 is another example of a longitudinal cross sectional view for an injection molding die of a polygon mirror unit cover in Embodiment 2 of the present invention.

FIG. 6 is a cross sectional view of the polygon mirror unit cover 30, and FIG. 7 and FIG. 8 are vertical cross sectional views of an injection molding die for the polygon mirror unit cover.

In the illustrated embodiment, the thickness a of the polygon mirror unit cover 30 is made as 2.2 mm. This is a thickness to obtain identical heat conduction with that of an aluminum die casting molding product. Although the thickness is reduced as described above, since the Young's modulus of magnesium is higher than that of aluminum, the rigidity is equivalent with that of an aluminum die casting product of 3 mm thickness. Further, since the weight is smaller while the rigidity is equivalent, the resonance frequency is much higher than the case of using aluminum. Accordingly, since the difference of frequency of vibrations generated from the polygon mirror and bearings thereof can be made larger, deflection of the axis of a scanning light can also be decreased.

Magnesium can be molded at a high accuracy in injection molding and there is no requirement of providing draft angle. While an aluminum die casting product requires secondary fabrication in order to ensure accuracy for portions of parting lines b, c shown in FIG. 6, the accuracy can be ensured in the magnesium injection molding product to set parting lines b, c to a portion d requiring accuracy. This makes secondary fabrication unnecessary.

Embodiment 3

Figure 9:
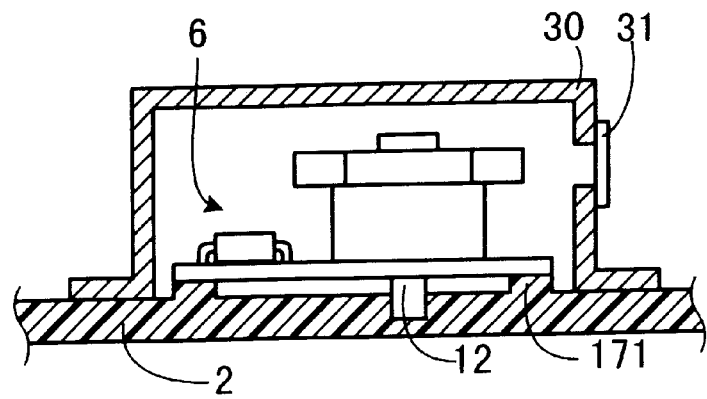
FIG. 9 is a longitudinal cross sectional view (partial cross sectional view) of an optical beam scanning device in Embodiment 3 of the present invention.

Embodiment 3 is a modification of Embodiment 2, in which the elastic sheet 17 used in Embodiment 2 is not used and, instead, the polygon mirror unit 6 is supported by a support 171 molded integrally with the casing 2 as shown in FIG. 9.

Embodiment 4

Figure 10:
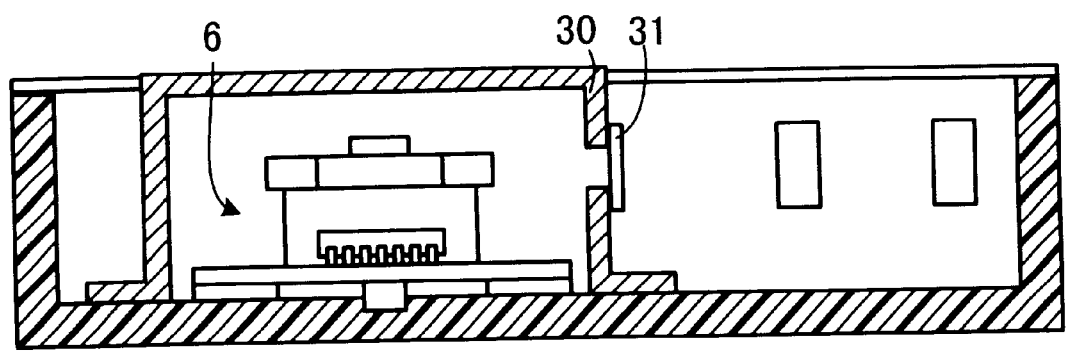
FIG. 10 is a longitudinal cross sectional view of an optical beam scanning device in Embodiment 4 of the present invention.

Embodiment 4 is basically identical with Embodiments 2 and 3. As shown in FIG. 10, a polygon mirror unit cover 30 is exposed to the outside of a housing cover 89 covering the entire optical housing 2 in these examples. Most of heat is dissipated from the upper surface of the polygon mirror unit cover 30 made of magnesium. This structure prevents intrusion of dusts from the outside to the inside of the casing 2 and also makes heat dissipation satisfactory.

Embodiment 5

Figure 11:
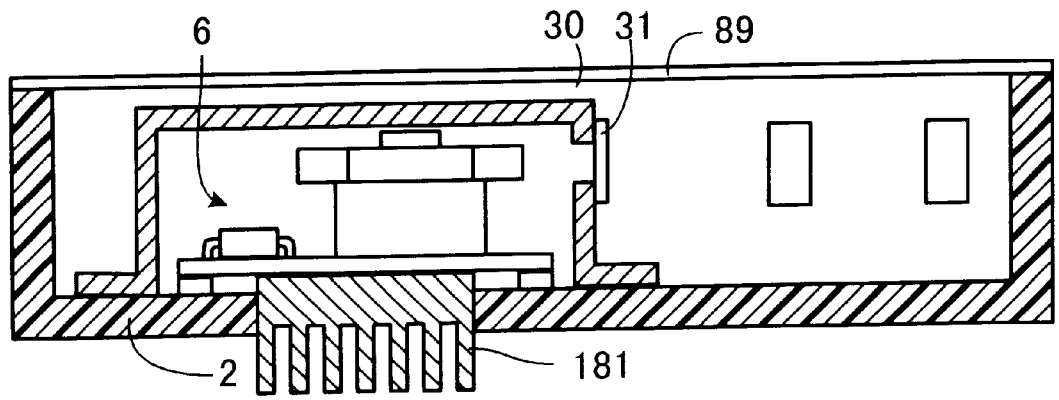
FIG. 11 is a longitudinal cross sectional view of an optical beam scanning device in Embodiment 5 of the present invention.

Embodiment 5 is basically identical with Embodiments 2, 3 and 4. As shown in FIG. 11, heat dissipating fins 181 are attached to an iron substrate 13. In this structures, heat is conducted from the iron substrate 13 directly to the heat dissipating fins 181 and dissipated by blowing air sent from an air blower not illustrated. It is of course possible to further add a structure that the polygon mirror unit 30 is exposed out of the housing cover as shown in Embodiment 4. Further it is also possible to make the housing cover 89 with metal and heat is dissipated also from the surface of the housing cover 89.

Embodiment 6

Figure 12:
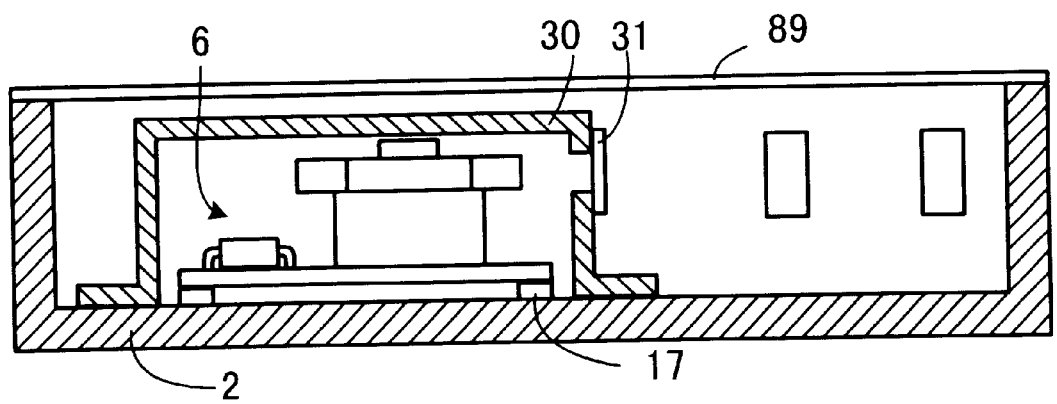
FIG. 12 is a longitudinal cross sectional view of an optical beam scanning device in Embodiment 6 of the present invention.

In Embodiment 6 (FIG. 12), a casing 2 and a polygon mirror unit cover 30 are made of magnesium. Most of heat is dissipated from the casing 2 by way of a path from the polygon mirror unit cover 30 to the casing 2 and a path from an iron substrate 13, an elastic sheet 17 and the casing 2.

Embodiment 7

When magnesium is in contact with a different kind of metal, corrosion occurs at the surface of contact thereof with lapse of time. Therefore, since members can not be attached by most frequently used bolts in a usual method, when magnesium is used for the casing of the polygon mirror unit, it is necessary to adapt such that screws are not in contact with magnesium upon fixing the members. While a constitution coping with the problem regarding attachment is not shown in previous examples, a way of attachment is shown in the following examples referring to a case of a polygon mirror unit cover 30 as an example.

Figure 13:
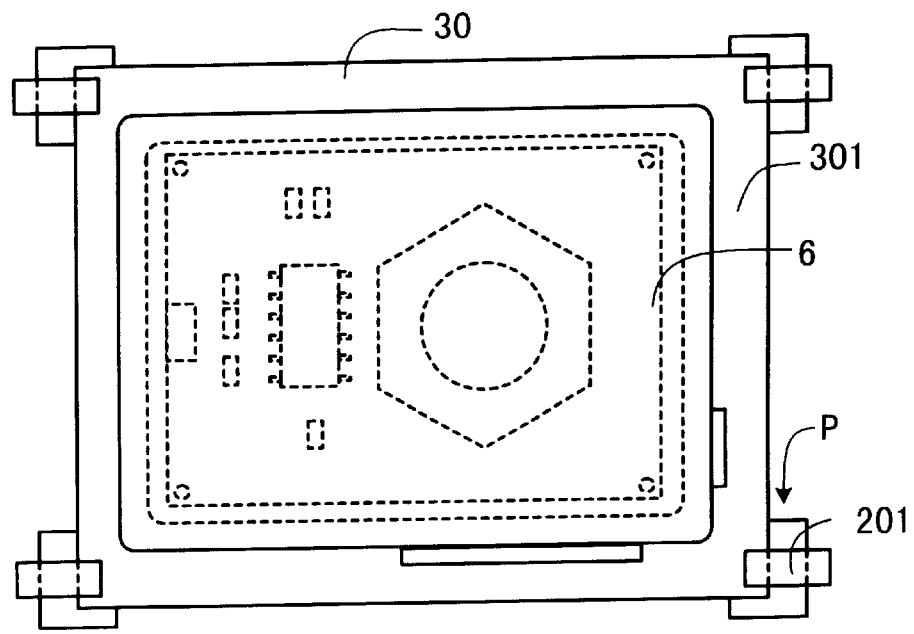
FIG. 13 is a view of a polygon mirror unit cover 30 and its vicinity as viewed from above in Embodiment 7 of the present invention.
Figure 14:
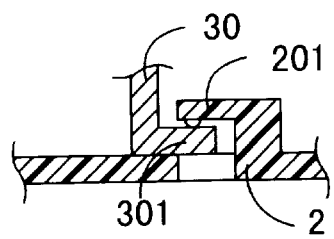
FIG. 14 is a vertical cross sectional view for an attaching portion P in FIG. 13.

FIG. 13 is a view showing the polygon mirror unit cover 30 and the vicinity thereof from above in Embodiment 7. FIG. 14 is a longitudinal cross sectional view of an attaching portion P.

A polygon mirror unit cover 30 made of magnesium has a flange 301, and the polygon mirror unit cover 30 is secured by retaining the flange by a retaining finger 201. The retaining finger 201 may be molded integrally with the casing 2 made of resin (not metal) or may be a separate member so long as it is not made of metal.

Embodiment 8

Figure 15:
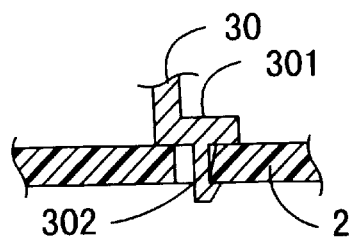
FIG. 15 is a longitudinal cross sectional view for another example (Embodiment 8) of an attaching method different from that in Embodiment 7.

FIG. 15 is a longitudinal cross sectional view showing an example of an attaching method different from that in Embodiment 7.

A flange 301 has an engagement having an elastic engagement 302 with a slope disposed to a lower portion thereof, and it is inserted into a hole formed in the casing 2 and secured by a so-called snap fit mode.

Embodiment 9

Figure 16:
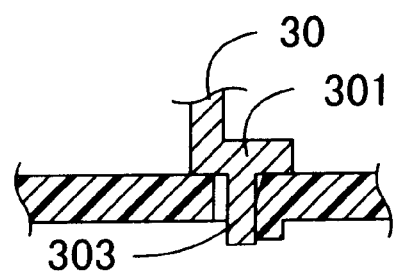
FIG. 16 is a longitudinal cross sectional view for other example (Embodiment 9) of an attaching method different from that in Embodiment 7 and Embodiment 8.

FIG. 16 is a longitudinal cross sectional view showing an example of other attaching way different from that in Embodiment 7 or 8.

A flange 301 has an elastic engagement 303 disposed to a lower portion thereof and it is inserted into a hole formed in the casing 2 made of non-metal and secured by a frictional force.

Embodiment 10

Since corrosion of magnesium is caused by contact with a different kind of metal, a screw is made of a material not a different kind of metal, namely, the screw may be made of an identical material.

Figure 17:
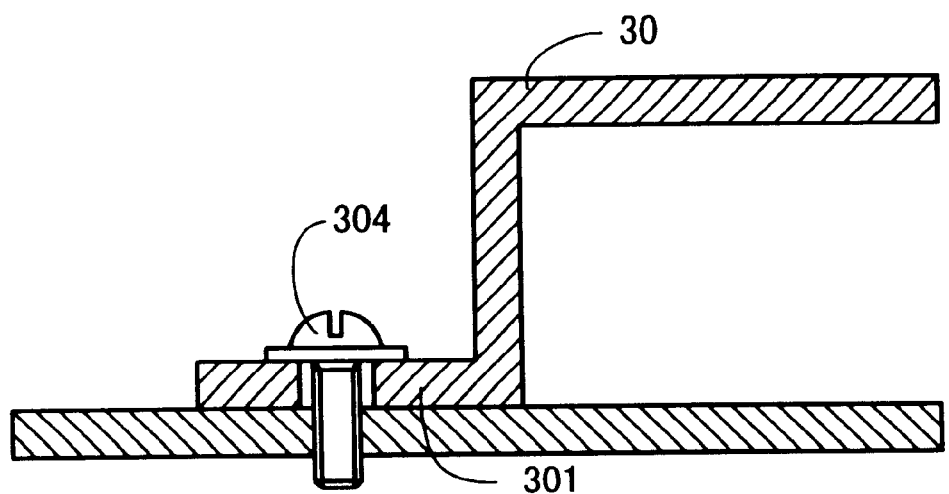
FIG. 17 is a longitudinal cross sectional view for other example (Embodiment 10) of an attaching method different from that in Embodiment 7 to Embodiment 9.
Figure 18:
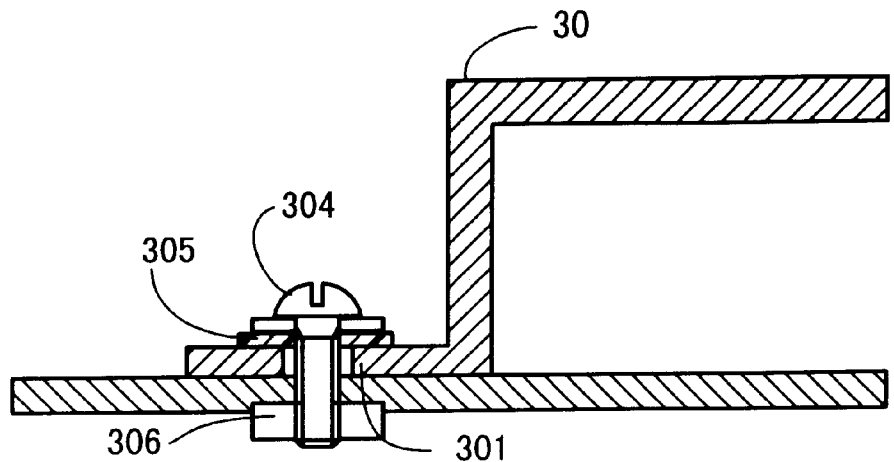
FIG. 18 is a longitudinal cross sectional view for other example (Embodiment 11) of an attaching method different from that in Embodiment 7 to Embodiment 10.

In Embodiment 10, a screw 304 is made of magnesium identical with the polygon mirror unit cover 2 as shown in FIG. 17. If magnesium is used for the screw, screw setting like that in the conventional method is possible.

Embodiment 11

In Embodiment 11, a usual material is used for a screw 304 and a washer 305 made of a non-metal material is interposed between the screw 304 and a casing 2 made of magnesium. A nut 306 may be used as shown in the figure, or a threaded hole is formed to the casing, and a screw 304 is threaded into the hole as shown in FIG. 17.

Embodiment 12

Figure 19:
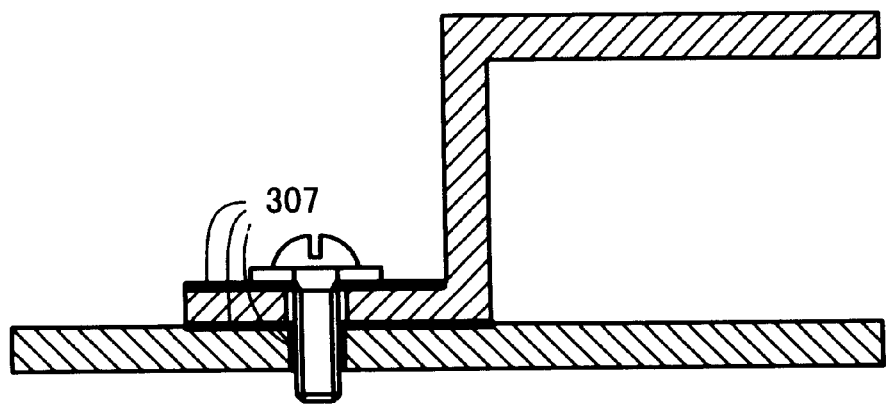
FIG. 19 is a longitudinal cross sectional view for other example (Embodiment 12) of an attaching method different from that in Embodiment 7 to Embodiment 11.

FIG. 19 is a longitudinal cross sectional view showing other embodiment. In this example, a resin coating 307 is applied to a portion of contact between magnesium and other material.

Embodiment 13

Figure 20:
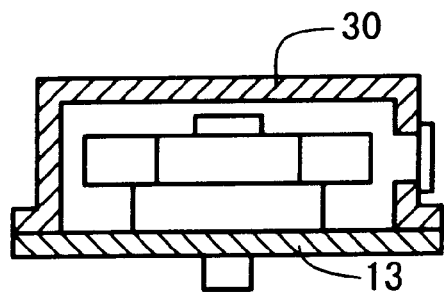
FIG. 20 is a longitudinal cross sectional view of a polygon mirror unit in Embodiment 13.

The polygon mirror unit cover 30 may be attached to the iron substrate 13. FIG. 20 is a longitudinal cross sectional view showing such an example. As described previously, since contact between magnesium of polygon mirror unit cover 30 and a different kind of metal should be avoided, a method, for example, described in Embodiments 6 to 12 can be adopted.

In this example, since the polygon mirror unit cover 30 and the polygon mirror unit 6 are integrated, this provides a merit capable of reducing the number of assembling steps upon assembling a laser beam scanning device.

Embodiment 14

Figure 21:
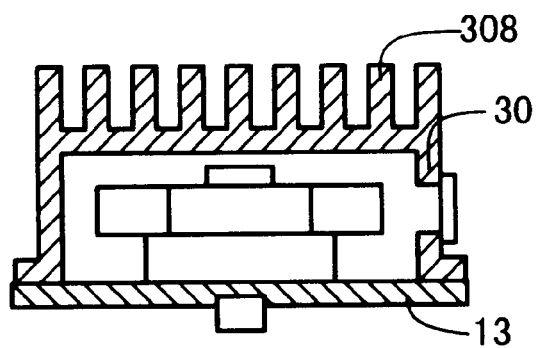
FIG. 21 is an modified embodiment of Embodiment 3, which is a vertical cross sectional view of a polygon mirror unit in Embodiment 14.

FIG. 21 is a longitudinal cross sectional view showing a modification of Embodiment 13. In this example, since heat dissipating fins 308 are further molded integrally with the upper surface of the polygon mirror unit cover 30, the rigidity of the cover 30 is improved and since heat is conducted to the heat dissipating fins 308 not by way of the face of contact, the efficiency is satisfactory.

Embodiment 15

Figure 22:
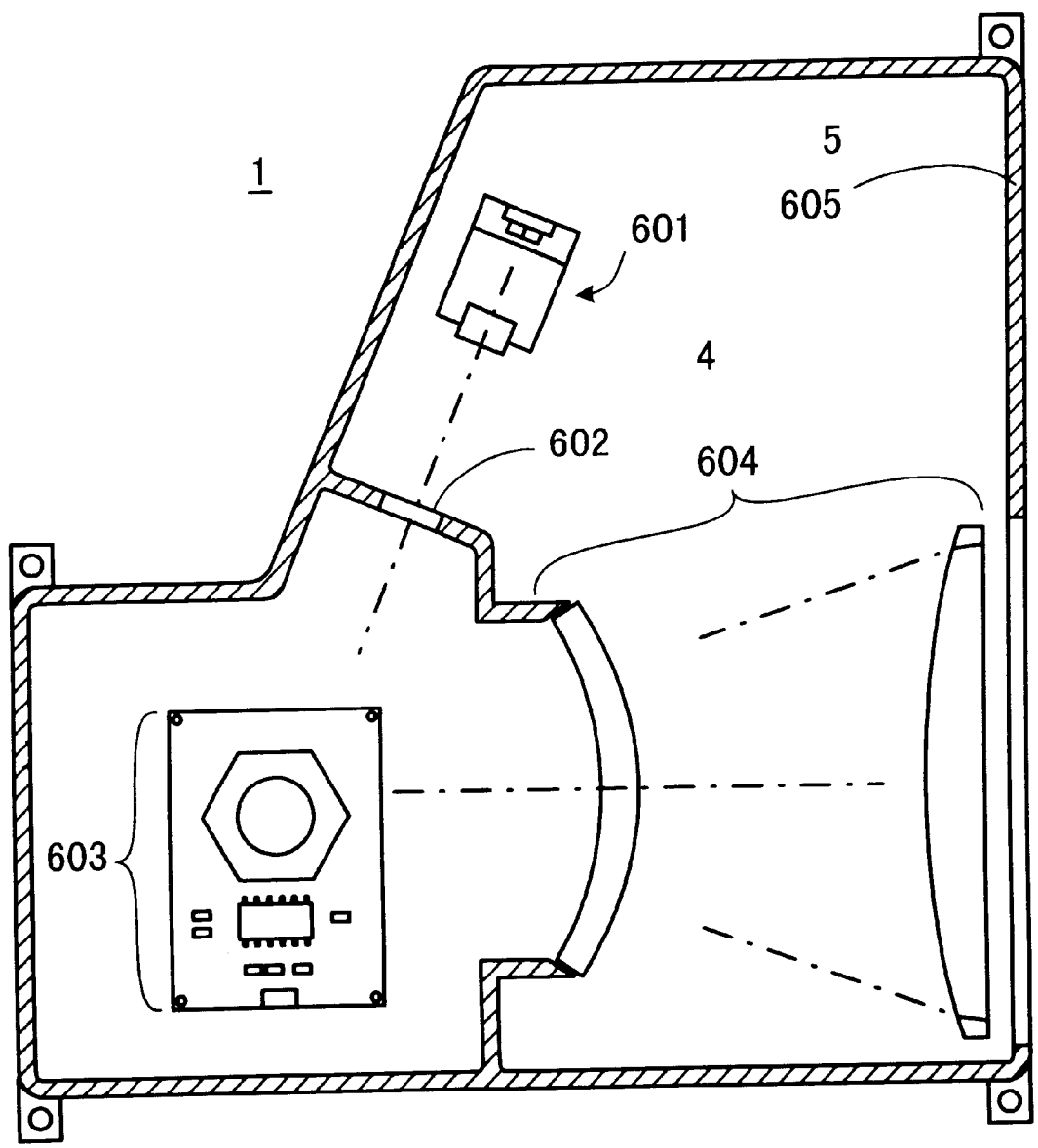
FIG. 22 and FIG. 23 are, respectively, a transversal cross sectional view and a longitudinal cross sectional view of an optical beam scanning device in the following Embodiment 15 to Embodiment 22.
Figure 23:
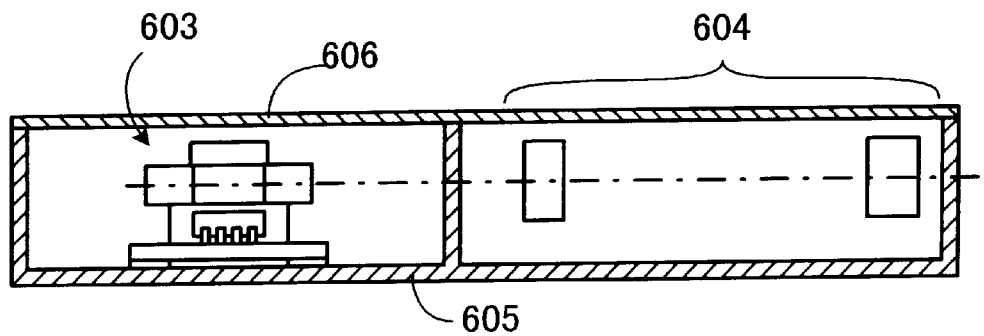

FIG. 22 and FIG. 23 are, respectively, a transversal cross sectional view and a longitudinal cross sectional view of an optical beam scanning device in the following Embodiments 15 to 22. In FIG. 22 and FIG. 23, are shown an optical beam scanning device 501, a laser light source 601, a cylindrical lens 602, a polygon mirror unit 603, a scanning lens (f θ lens) group 604, a casing 606 for the optical beam scanning device and a casing cover 606 for the casing 605.

The laser light source 601 is grouped into a type disposed in the casing 605 as shown in FIG. 22 and a type disposed to the lateral outer side of the casing 605. Since the laser light source 601 is exposed to an external surrounding in the latter type, this is not suitable to the present invention of using the Mg injection molding product having a defect sensitive to corrosion.

Accordingly, in this example, the laser light source 601 is disposed in the casing 605 and the casing 605 is sealed by a casing cover as illustrated in FIG. 23 to prevent corrosion.

Figure 24:
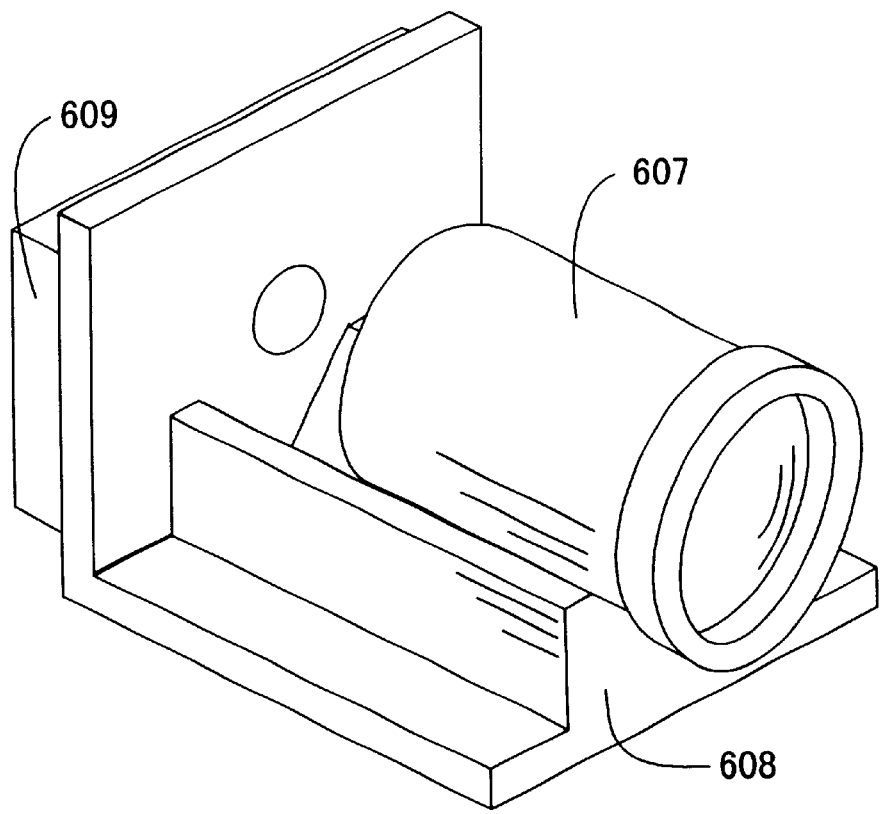
FIG. 24 is a perspective view of a laser light source.

FIG. 24 shows an example of an laser light source. A laser light source 601 mainly comprises, as shown in the figure, an LD holder 609, a collimator lens barrel 607 and a collimator holder 608.

Further, a laser diode (LD) not illustrated is contained in the LD holder 609. A collimator lens not illustrated is housed in the collimator lens barrel 607.

At first, explanation is to be made for the change of refractive index of a lens caused by temperature change $\Delta t$. The present invention concerns temperature compensation in the main scanning direction (on a plane parallel with the deflection plane) and, since the cylindrical lens 602 has no refraction within the plane, explanation therefor will be omitted. The situation is same also for the polygon mirror unit 603.

For the refractive index of the lens, not only the change due to the direct temperature change but also the change due to the change of the oscillation wavelength of a semiconductor laser as a light source has also to be taken into consideration. This is calculated according to the following equation (1):

$$n' = n + \{-(n-1)\cdot v^{-1}\cdot \Delta\lambda + d\}\cdot \Delta t \quad (1)$$

where n: refractive index of a lens before undergoing temperature change, n': refractive index of a lens after undergoing temperature change $\Delta t$, $v^{-1}$: dispersion rate of a lens, $\Delta \lambda$: temperature dependence coefficient of a laser oscillation wavelength d: temperature dependence coefficient of a lens refractive index.

Then, since the focal length undergoes the effect also of thermal deformation (thermal expansion) of lens in addition to the change of the refractive index, it is expressed by the following equation (2):

$$fl' = \{(n-1)/(n'-1) + \Delta L \cdot \Delta t\}\cdot fl \quad (2)$$

where fl: focal length of a lens before undergoing temperature change fl': focal length of a lens after undergoing temperature change $\Delta t$ $\Delta L$: linear expansion coefficient of a lens As a result, when the temperature change $\Delta t$ is positive, that is, when the temperature is elevated, the focal length for each of the collimator lens and the f θ lens is extended, and the focal point on a medium to be scanned is shifted toward a positive side unless the distance between the laser emission point and the collimator lens does not change.

Then, the amount of change of the distance between the laser emission point and the collimator lens required for compensating the shifting of the focal point is calculated. The amount of change is calculated for that of the collimator lens (L1) and of the f θ lens (L2) respectively. For constituting the temperature compensation system, an amount of change equal with the sum of two values has to be formed by thermal deformation of a light source holding member.

At first, for the shifting amount L1 of the laser emission point for compensating an image field shift caused by the change of the focal length of the collimator lens, the following equation (3) is established.

$$L1 = fl'_{co} - fl_{co} \quad (3)$$
$$= (v_{co}^{-1}\cdot \Delta\lambda - d_{co}/(n_{co}-1) + \Delta L_{co})\cdot fl_{co}\cdot \Delta t$$

In the equation described above, the shifting amount of the laser emission point is made equal with the change of the focal length (of the collimator lens). This relation is established strictly in a constitution in which the luminous flux diverging from the laser emission point is made into a completely parallel light by the collimator lens but the relationship is substantially satisfied also in an arrangement of providing a converging light or diverging light approximate to a parallel light to such an as extent capable of constituting as a laser light source for an optical scanning device.

Then, for the shifting amount L2 of the laser emission point for compensating an image field shift caused by the change of the focal length of the f θ lens, the following equation (4) is established.

$$(L2 = (1/fl_{f\theta} - 1/fl'_{f\theta})\cdot fl_{co}^2 \quad (4)$$
$$\approx (fl'_{f\theta} - fl_{f\theta})\cdot fl_{co}^2/fl_{f\theta}^2$$
$$= \{v_{f\theta}^{-1}\cdot \Delta\lambda - d_{f\theta}/(n_{f\theta}-1) + \Delta L_{f\theta}\}\cdot fl_{co}^2/fl_{f\theta}\cdot \Delta t$$

The equation described above is also for a parallel light like that for L1 and since it undergoes less effect by the state of a luminous flux from the collimator lens than the case of L1, it is negligible.

On the other hand, the distance between the laser emission point and the collimator lens is actually changed by the thermal deformation (thermal expansion) of a light source holding member. Assuming the amount of change as L3, the following equation (5) is established:

$$L3 = \alpha\cdot fl_{co}\cdot \Delta t \quad (5)$$

where α: linear expansion coefficient of a holding member.

The equation (5) described above for L3 is a calculation formula for the amount of change, in a case where the linear expansion coefficient of the holding member consists of one kind, or in a case where the holding member comprises a plurality of materials having different linear expansion coefficient, with an α being a synthetic linear expansion coefficient for them.

The holding member comprises an LD holder 609, a collimator lens barrel 607 and a collimator holder 608.

From the foregoing, for establishing the temperature compensation system, it is necessary to satisfy the following equation (6).

$$L3 \approx L1+L2 \quad (6)$$

Various physical property vales at 20° C. are shown in tables of FIGS. 25, 26 and 27. FIG. 25 is a table showing the laser oscillation wavelength and fluctuation of the oscillation wavelength per unit temperature under a normal temperature (20° C.). FIG. 26 is a table for various factors of an optical system under a normal temperature. FIG. 27 is a table showing linear expansion coefficients of materials for the light source holding member (holding member) with respect to magnesium, aluminum and iron. Tables of FIG. 28 to FIG. 32 show concrete examples of numerical values, when the circumferential temperature is elevated by 30° C., derived from the equations (1) to (6) described above based on the numerical values in the tables described above.

Figures 32, 33:
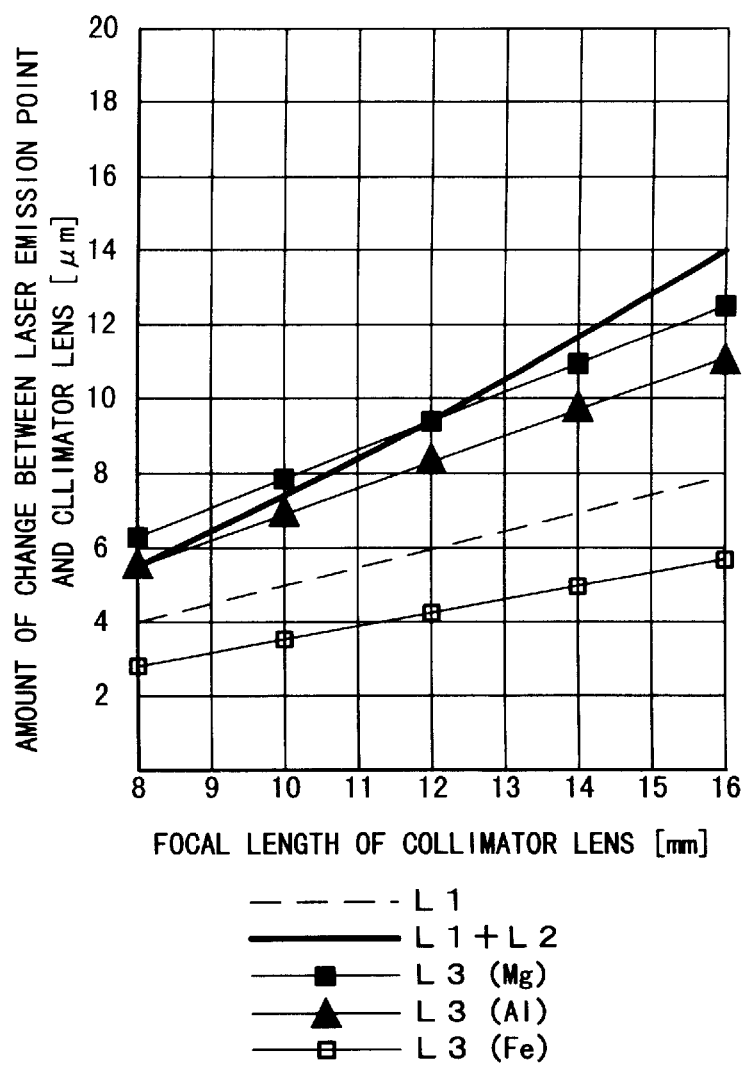
FIG. 32 is a table for numerical values of a amount of change (L3) between the laser emission point of the light source holding member and a collimator lens with respect to magnesium, aluminum and iron.
FIG. 33 is a graph formed by plotting the numerical values in FIG. 30 to FIG. 32.

FIG. 28 is a table showing values for the laser oscillation wavelength at 50° C., FIG. 29 is a table showing a refractive index and a focal length at the same temperature for the collimator lens and the f θ lens. FIG. 30 shows the effect of temperature elevation of the collimator lens for various focal length. FIG. 31 is a table for numerical values obtained for the shifting amount of the laser emission point (L2) for various focal length of the collimator lens in order to compensate the image field shift caused by the change of the focal length of the f θ lens. FIG. 32 is a table for numerical values determined for the amount of change (L3) between the laser emission point and the collimator lens of the light source holding member with respect to magnesium, aluminum and iron.

Since the collimator lens made of resin has excessively high sensitivity to the temperature change and since it is also possible to manufacture by the molding of glass as described previously, they are shown only for the case of glass. Calculation is made only for the resin lens (ZEONEX: trade name) for the f θ lens. L2 is substantially 0 if the lens is entirely made of glass and it situates between L1 and L1+L2 of Embodiment 15 in a case of combined use of the resin lens and the glass lens, it is omitted.

FIG. 33 is a graph formed by plotting numerical values of the calculation examples described above.

As has been described previously, if the f θ lens is entirely made of glass, L2 is substantially 0 (if f θ lens is SF57, it is about 7% compared with the case of ZEONEX in Embodiment 15. L2 (SF57) is substantially 0.07 L2 (ZEONEX)). Accordingly, it can be seen that those having a (synthetic) linear expansion coefficient about between Fe and Al are suitable in a case of using only glass for the f θ lens. However, in order to cope with increasing density for printing density (decrease of the beam diameter and reduction of the curvature of image field), it is indispensable to make the f θ lens into an aspherical or free curved surface, for which lens made of resin is necessary (it is difficult to make a large lens as a f θ lens by glass molding). Accordingly, those having large linear expansion coefficient like that Mg injection molding product or Al are necessary.

Further, it can be seen from FIG. 33 that L1+L2 intersect L3 in Embodiment 15 in a case, in which (a): L3 is am Mg injection molding product and a collimator lens has a focal length of 12 mm, (b): L3 is made of Al (aluminum) and a focal length of a collimator lens is 8 mm.

However, it is necessary to enlarge the width of the luminous flux in order to reduce the diameter of the beam, and the wide of the luminous flux is calculated by the following equation (7):

$$D = 4\lambda \cdot fl_{f\theta}/\pi/D_0 \quad (7)$$

where

D: width of a luminous flux on an f θ lens $D_0$: beam diameter on a plane to be scanned In the formula (7) described above, D represents the width of luminous flux on the f θ lens. Since the luminous flux going out of the collimator lens is a substantially parallel light, it is substantially equal with the widen of the luminous flux on the collimator lens. Accordingly, assuming the D as the width for the luminous flux on the collimators, the focal length of the collimator lens can be calculated according to the following equation (8):

$$fl_{co} = D \cdot F_{no} \quad (8)$$

where $F_{no}$: F number of collimator lens.

Smaller $F_{no}$ can reduce the loss of optical amount by an aperture disposed near the collimator lens and can suppress the output of the optical source. However, in view of the manufacture of the collimator lens, a lens with a smaller $F_{no}$ is difficult to be fabricated and it is desirable that $F_{no}$ is 1.9 or larger in order to constitute the collimator lens with a single lens.

FIG. 33 is determined for a case of $F_{no}$=2. If the beam diameter is about 70 μm, the focal length of the collimator lens is 8.5 mm and Al (aluminum) described in b above can be used. However, if the beam diameter is intended to reduce to about 50 μm, the focal length of the collimator lens is 12 mm for which the Mg injection molding product in a above is optimal.

In a case where the holding member is a resin molding product, a linear expansion coefficient can be formed to some extent by mixing a glass fibers or the like with a resin. However, since the expansion is not uniform depending on the way of resin flow and the heat dissipation is poor as described previously, it is preferably not used in a place giving a direct effect on the distance between the light source and the collimator lens.

Figure 34:
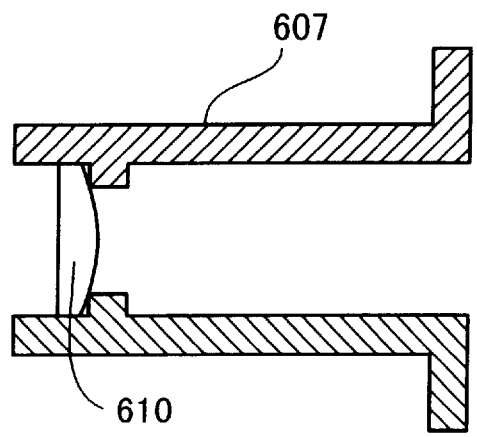
FIG. 34 shows a collimator lens barrel 607 and a collimator lens 610 in the example.
Figure 35:
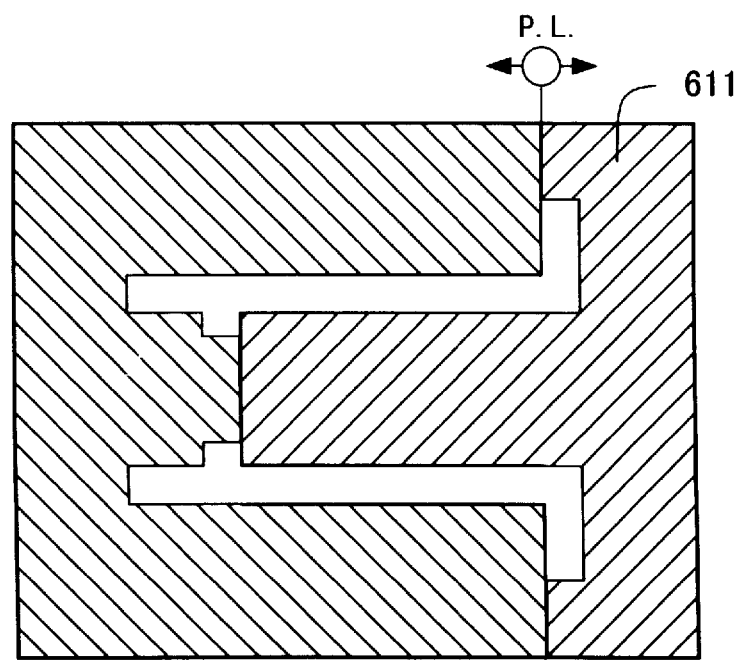
FIG. 35 shows constitution of a mold 611 for a collimator lens barrel and parting line P.L in this example.

FIG. 34 shows a collimator lens barrel 607 and a collimator lens 610 of Embodiment 15, and FIG. 35 shows a constitution of a mold 611 for a collimator lens barrel and a parting line P.L. in Embodiment 15.

The collimator lens barrel 607 is prepared by injection molding of magnesium using the mold 611 shown in FIG. 35.

In Embodiment 15 using a magnesium injection molding product (hereinafter referred to as Mg injection molding product) for the collimator lens barrel 807, a collimator lens barrel shown in FIG. 34 can be molded also by using the constitution of the mold shown in FIG. 35 with no draft angle or the secondary fabrication, which is free from disadvantages such as slant of the optical axis and the limit for the controlling range of rotation as in the case of the resin molding product to be shown below.

Figure 36:
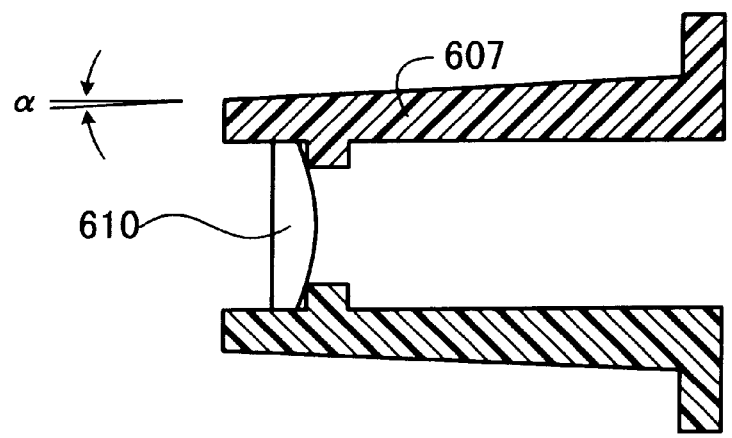
FIG. 36 is a view showing a mold necessary for molding in a case of making a collimator lens barrel with a resin.

If the resin molding product is intended to be molded by the same constitution of the mold as in FIG. 35, a draft angle a as shown in FIG. 36 is required, so that a cylindrical portion of the collimator lens barrel 607 in contact with a collimator holder 608 has to be shaped into a conical configuration. Therefore, the collimator lens is attached with the optical axis being slanted.

Figure 37:
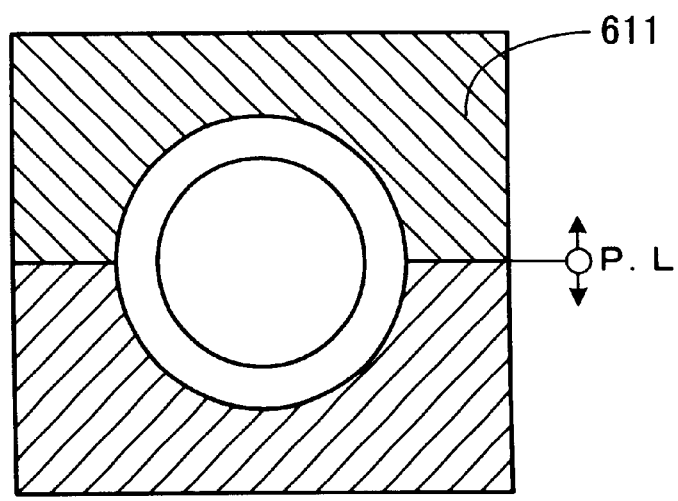
FIG. 37 is a view showing another example of a mold necessary for molding in a case of making a collimator lens barrel with a resin.
Figure 38:
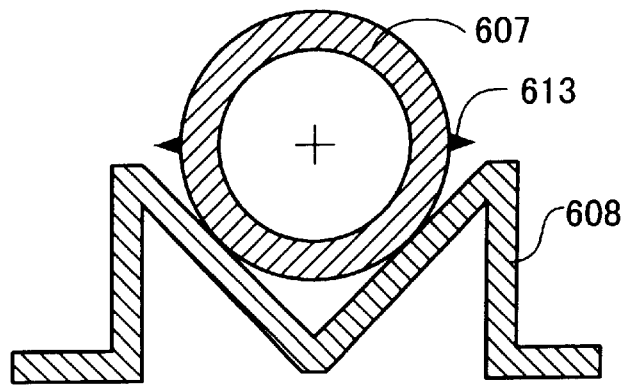
FIG. 38 is a cross sectional view showing a relation with respect to a collimator holder 608 when a collimator lens barrel has burrs (Embodiment 15).

Further, if a parting line P.L. in the constitution of the mold for the outer side of the collimator lens barrel are defined as shown in FIG. 37 for eliminating the draft angle, burrs 613 are formed to the cylindrical portion as shown in FIG. 38.

If the burrs 613 are situated to be in contact with the collimator holder 608, the positional accuracy is worsened, so that it has to be situated at an angle dodging the bars 613. Therefore, a range capable of rotationally controlling the collimator lens barrel 607 around the optical axis of the collimator lens as the rotational axis is narrowed.

Embodiment 16

Figure 39:
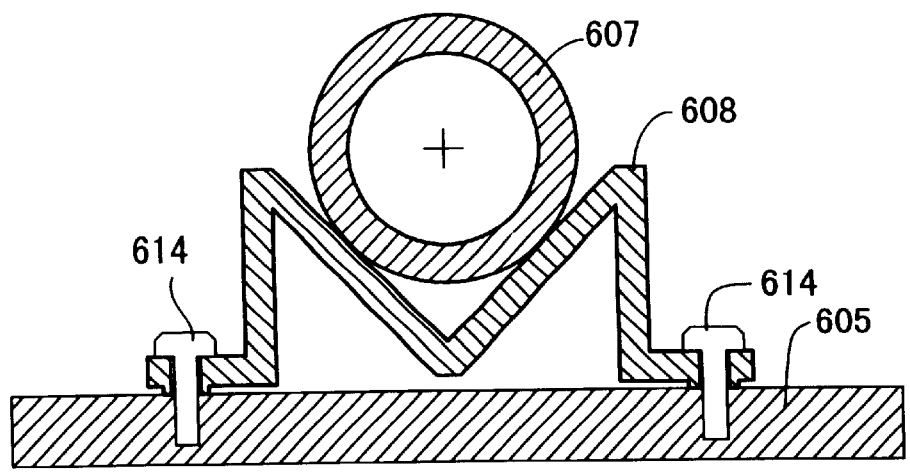
FIG. 39 is a cross sectional view showing a relation between a collimator holder 608 and a case 605 in which the collimator holder 608 is am Mg injection molding product, and the case 605 is made of a resin.

FIG. 39 shows an example using a collimator holder 608 made of am Mg injection molding product and a casing 605 made of a resin in which screws 614 made of resin are used for setting the collimator holder 608 and the casing 605.

Resin screws are used for preventing corrosion since a contact portion between the collimator holder 608 as the Mg injection molding product and the screws are liable to be corroded if the screws are made of metal.

Embodiment 17

Figure 40:
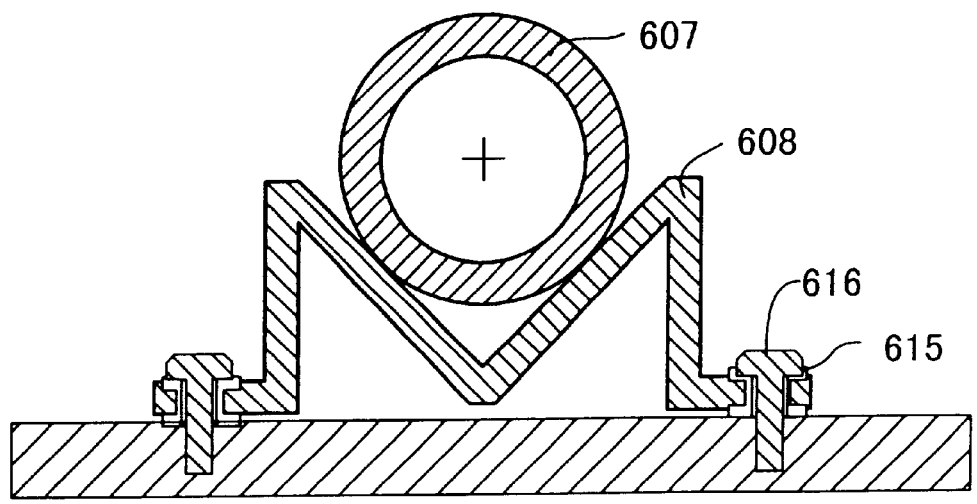
FIG. 40 is another cross sectional view showing a relation between a collimator holder 608 and a case 605 in which the collimator holder 608 is an Mg injection molding product.

In FIG. 40, a collimator holder 608 is formed as an Mg injection molding product and an annular member 615 is fit into the securing hole of the collimator holder 608, so that screws 616 and the collimator holder 608 are not in direct contact with each other.

Since corrosion for the contact portion can be prevented with this constitution, metal screws 616 can be used.

Figure 41:
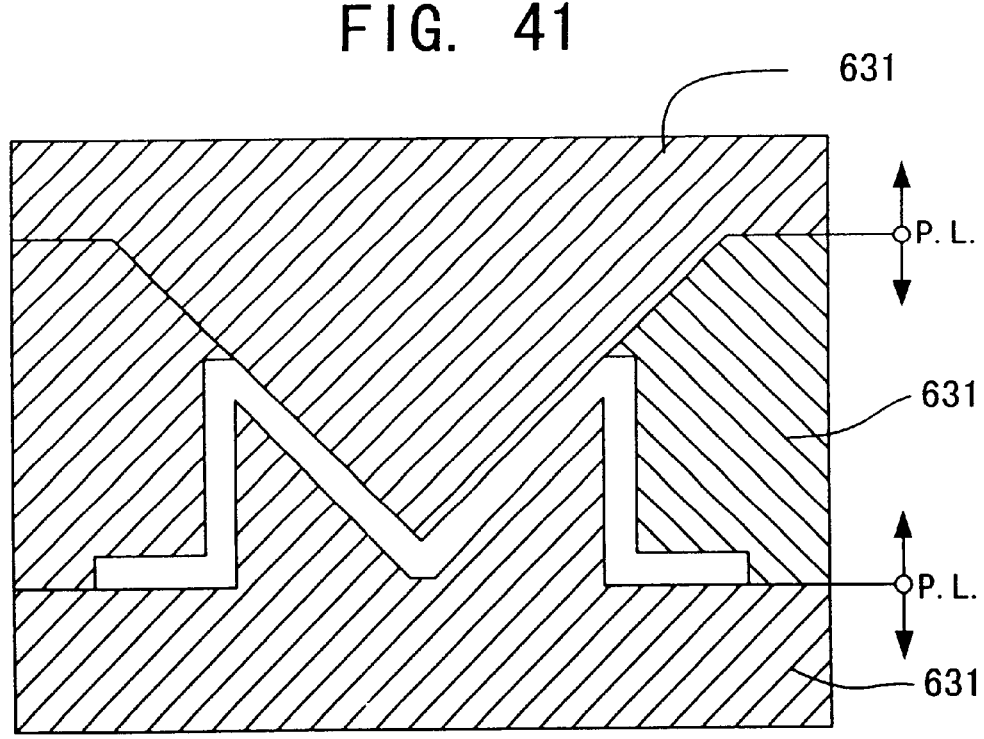
FIG. 41 is a cross sectional view of a mold for injection molding of a collimator holder (Embodiment 17).

FIG. 41 shows a cross section of a mold used for injection molding of a collimator holder.

A mold 631 has a parting line P.L. shown in FIG. 41. Since the parting line P.L. are formed at a face in contact with the collimator lens barrel 607 and the casing 605, it is not necessary to remove burrs from the collimator holder 608 after injection molding.

Embodiment 18

Figure 42:
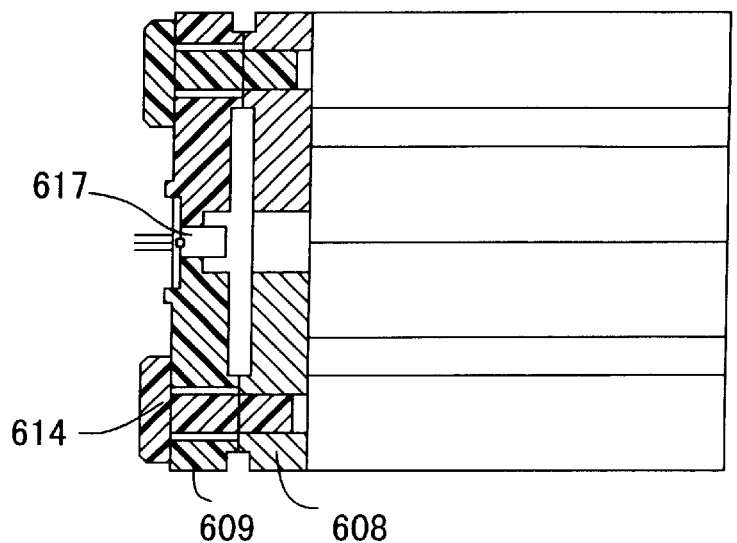
FIG. 42 is a cross sectional view of an assembly of a collimator holder 608 and an LD holder 609 (Embodiment 18).

FIG. 42 is a cross sectional view of an assembly comprising a collimator holder 608 and an LD holder 609. In this example, the collimator holder 608 is an Mg injection molding product, the LD holder 609 is made of a resin and resin screws 612 are used for setting the LD holder 609 and the collimator holder 608. A laser diode 617 is attached to a central portion of LD holder 619 such that the center of the diode is aligned with that of the collimator lens.

The resin screw 614 is used instead of a metal screw in order to prevent corrosion of the contact portion between the Mg injection molding product (collimator holder 608) and the screw.

Embodiment 19

Figure 43:
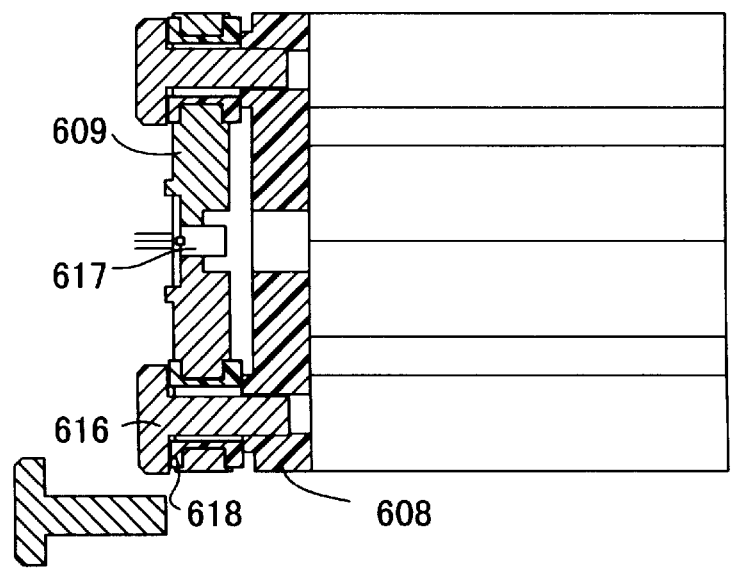
FIG. 43 is another cross sectional view of an assembly of a collimator holder 608 and an LD holder 609 (Embodiment 19).

FIG. 43 is a cross sectional view for other embodiment different from Embodiment 18. An LD holder 609 is formed as am Mg injection molding product and an annular portion 618 made of a resin is fitted into a securing hole of the LD holder 609, so that the metal screw 616 and the LD holder 609 are not in direct contact with each other.

With the constitution as in this example, since the Mg injection molding product (LD holder 609) and the metal screw 616 are not in contact with each and corrosion for the contact portion is prevented, metal screws can be used.

Embodiment 20

Figure 44:
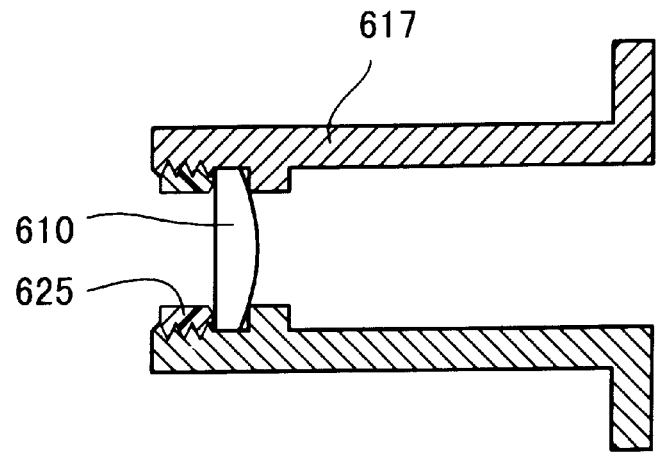
FIG. 44 is a cross sectional view of other embodiment in which an Mg injection molding product is used for a collimator lens barrel 607 (Embodiment 20).

FIG. 44 is a cross sectional view of a further example using am Mg injection molding product for a collimator lens barrel 617.

A collimator lens 610 is fixed to the collimator lens barrel 617 by a fixing member 625. A fixing member 625 can be constituted with a screw threaded into the collimator lens barrel 617, a ring press fitted into the lens barrel or a ring bonded to the lens barrel.

Further, the fixing member 625 is made of the same material as the collimator lens barrel 617 or made of a plastic material.

Embodiment 21

Figure 45:
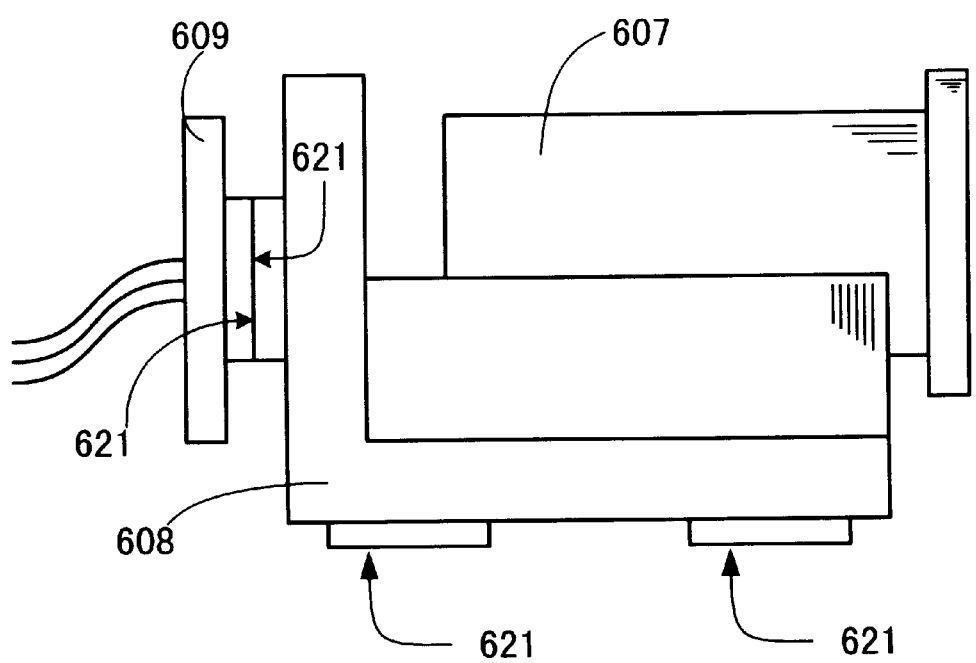
FIG. 45 is a side elevational view of an assembly having a collimator holder 608, a collimator lens barrel 607 and an LD holder 608 (Embodiment 21).

FIG. 45 is a side elevational view of an assembly comprising a collimator holder 609, a collimator lens barrel 607 and an LD holder 608, for explaining a contacting seat 621 of the collimator holder 608 and the LD holder 609. The contacting seat 621 is important for securing a positional accuracy with respect to other parts, for which secondary fabrication was necessary in conventional aluminum die casting for securing the accuracy.

In an Mg injection molding product, the accuracy can be secured by situating the parting line P. L. at the position for the contacting seat face 621 and no secondary fabrication is required.

Embodiment 22

Figure 46:
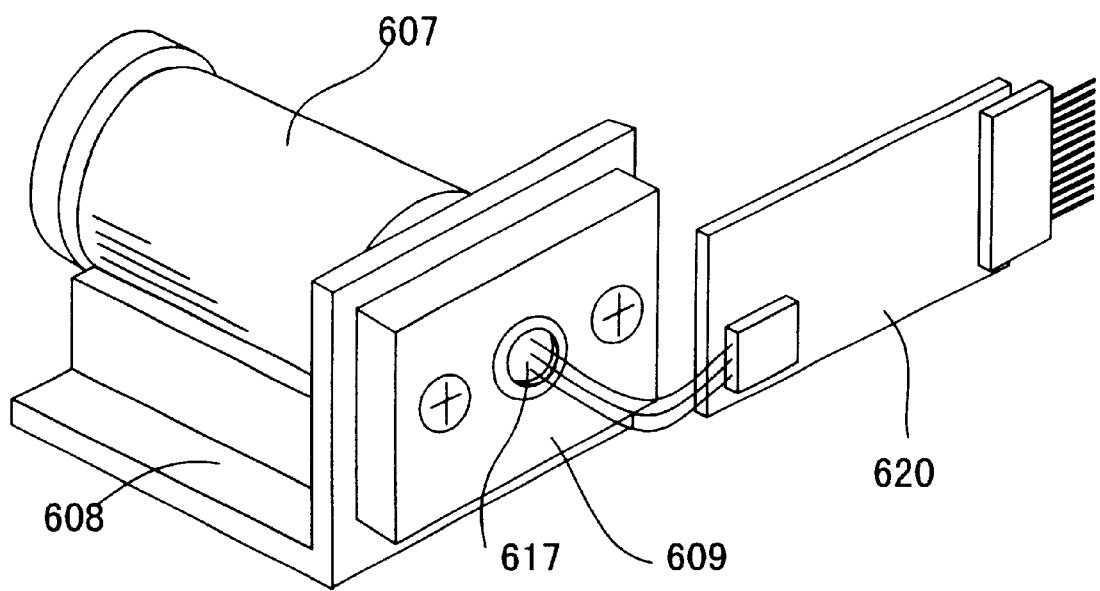
FIG. 46 is a perspective view showing the situation for attaching an LD drive circuit substrata 620 in which an LD holder 609 is an Mg injection molding product (Embodiment 22).

FIG. 46 is a perspective view showing a way of attaching an LD drive circuit substrate 620 in a case of using an LD holder 609 made of am Mg injection molding product.

Conventionally, an LD drive circuit substrate 620 was often secured to the LD holder 609 by means of screws and legs of a laser diode LD are directly soldered to the LD drive circuit substrate 620.

Since the LD holder 609 is an Mg injection molding product, fine screw fabrication is difficult, so that the substrate can not be secured by screws to the LD holder (The screws shown in FIG. 46 are used for attaching the LD holder 609 to the collimator holder 608. LD holder 609 is not provided with threading screw fabrication).

Then, in this Embodiment 22, the LD drive circuit substrate 620 and a light source block are made as separate blocks thereby avoiding provision of screw holes to the LD holder 609. The LD drive circuit substrate 620 are secured to a casing or the like (not illustrates).

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An optical device comprising:
    a light source,
    a collimator lens which forms a luminous flux emitted from said light source into a substantially parallel light,
    a holding member which holds at least one of said light source and said collimator lens, wherein at least a portion of said holding member comprises magnesium or magnesium alloy and is metal-injection molded, and
    said holding member further comprising:
        a lens barrel which holds said collimator lens at the inside and
        a lens barrel support member having two inclined surfaces for supporting said lens barrel on the inclined surfaces.

2. An optical device according to claim 1, wherein said lens barrel support member is metal-injection molded with a parting line being defined on said inclined surfaces.

3. An optical device according to claim 1, wherein said lens barrel has a substantially cylindrical surface and metal-injection molded with a parting line being defined on the surface other than the cylindrical surface.

4. An optical device according to claim 1, wherein an outer circumferential surface of said lens barrel is formed as a cylindrical surface with no draft angle.

5. An optical device according to claim 1, wherein
said holding member is metal-injection molded with a parting line being defined on the surface in contact with another member.

6. An optical device comprising:

a light source, a collimator lens which forms a luminous flux emitted from said light source into a substantially parallel light, a holding member which holds at least one of said light source and said collimator lens, wherein at least a portion of said holding member comprises magnesium or magnesium alloy, said holding member being metal-injection molded having a parting line being defined on the surface in contact with another member, and
wherein said holding member is a lens barrel supporting member for supporting said lens barrel including a collimator lens and
said another member is a light source holding member for holding the light source.

7. An optical device comprising:

a light source, a collimator lens which forms a luminous flux emitted from said light source into a substantially parallel light, a holding member which holds at least one of said light source and said collimator lens, wherein at least a portion of said holding member comprises magnesium or magnesium alloy and is metal-injection molded, and a securing member which secures the holding member to another member, wherein
at least a surface of the securing member in contact with said holding member comprises magnesium, magnesium alloy or non-metal material.

8. An optical device comprising:

a light source, a collimator lens which forms a luminous flux emitted from said light source into a substantially parallel light, a holding member which holds at least one of said light source and said collimator lens, wherein at least a portion of said holding member comprises magnesium or magnesium alloy and is metal-injection molded, and a deflection member which deflects and scans a luminous flux being made substantially parallel by said collimator lens.

9. An optical device according to claim 8, further comprising:

an fθ lens for focusing said luminous flux deflected by said deflection member on a surface of an object.

10. An optical device according to claim 9, wherein said fθ lens includes at least one plastic lens element.

11. An optical device according to claim 10, wherein said plastic lens element has a positive focal power.

12. An optical device according to claim 8, wherein said holding member further comprises a lens barrel which holds said collimator lens at the inside and a lens barrel support member having two inclined surfaces for supporting said lens barrel on the inclined surfaces.

13. An optical device comprising:

a light source, a collimator lens which forms a luminous flux emitted from said light source into a substantially parallel light, a holding member which holds at least one of said light source and said collimator lens, and said holding member further comprising:
a lens barrel which holds said collimator lens at the inside,
a lens barrel support member having two inclined surfaces for supporting said lens barrel on the inclined surfaces, and
a light source holding member which holds said light source, wherein at least one of said lens barrel, said lens barrel support member and said light source holding member is molded from magnesium or magnesium alloy as a constituent material.

14. An optical device comprising:

a light source, a collimator lens which forms a luminous flux emitted, from said light source into a substaintially parallel light, a holding member which holds at least one of said light source and said collimator lens, and said holding member further comprising:

a lens barrel which holds said collimator lens at the inside, a lens barrel support member having two inclined surfaces for supporting said lens barrel on the inclined surfaces, and a light source holding member which holds said light source, wherein at least one of said lens barrel, said lens barrel support member and said light source holding member is metal-injection molded.

* * * * *